US011257599B2

(12) United States Patent
Vigliano et al.

(10) Patent No.: US 11,257,599 B2
(45) Date of Patent: Feb. 22, 2022

(54) METHOD FOR INSPECTING CORE SHROUD USING REMOTE OPERATED VEHICLE (ROV)

(71) Applicant: GE-Hitachi Nuclear Energy Americas LLC, Wilmington, NC (US)

(72) Inventors: Vincent Carl Vigliano, Wilmington, NC (US); William A. Morrison, Wilmington, NC (US); Edmund S. Mercier, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 17/071,148

(22) Filed: Oct. 15, 2020

(65) Prior Publication Data

US 2021/0125738 A1    Apr. 29, 2021

Related U.S. Application Data

(62) Division of application No. 15/237,979, filed on Aug. 16, 2016, now Pat. No. 10,811,150.

(51) Int. Cl.
*G21C 17/013* (2006.01)
*G21C 19/20* (2006.01)
(Continued)

(52) U.S. Cl.
CPC ......... *G21C 17/013* (2013.01); *G21C 17/007* (2013.01); *G21C 17/01* (2013.01);
(Continued)

(58) Field of Classification Search
CPC .... F22B 37/483; F22B 37/002; G21C 17/013; G21C 17/007; G21C 19/207; G01N 29/265; Y10S 165/003
See application file for complete search history.

(56) References Cited

U.S. PATENT DOCUMENTS 3,165,835 A  *  1/1965  Duncan ............... G01B 11/27
                                                    33/286
3,987,666 A    10/1976  Blanc et al.
(Continued)

FOREIGN PATENT DOCUMENTS

EP    02910330 A2    8/2015
JP    61-21963 U     2/1986
(Continued)

OTHER PUBLICATIONS

Japanese Office Action dated Jun. 15, 2021, issued in corresponding Japanese Application No. 2017-149562.

*Primary Examiner* — Lily C Garner
(74) *Attorney, Agent, or Firm* — Harness, Dickey & Pierce, P.L.C.

(57) ABSTRACT

The method includes installing a system for inspecting the core shroud on the core shroud, driving the system horizontally around the core shroud, and using a sensor of the system to inspect the core shroud, where the system includes a trolley, an arm, a tether, and a remotely operated vehicle (ROV) for inspecting the core shroud. The ROV includes a body configured to be operatively connected to the tether, and the sensor is configured to be operatively connected to the body, and configured to provide inspection information of the core shroud. The arm is configured to be operatively connected to the trolley. The ROV is configured to be operatively connected to the arm via the tether, and the tether is configured to provide vertical position information for the ROV relative to the outer surface of the core shroud.

4 Claims, 17 Drawing Sheets

(51) Int. Cl.
*G21C 17/01* (2006.01)
*G21C 17/007* (2006.01)
*G01N 29/265* (2006.01)
*B25J 11/00* (2006.01)
*F22B 37/48* (2006.01)
*F22B 37/00* (2006.01)

(52) U.S. Cl.
CPC ............ *G21C 19/207* (2013.01); *B25J 11/00* (2013.01); *F22B 37/002* (2013.01); *F22B 37/483* (2013.01); *G01N 29/265* (2013.01); *Y10S 165/003* (2013.01)

(56) References Cited

U.S. PATENT DOCUMENTS

| | | | |
|---|---|---|---|
| 4,330,865 A | | 5/1982 | Hyde et al. |
| 4,429,329 A | | 1/1984 | Clemens et al. |
| 4,760,876 A | * | 8/1988 | Minogue ............... F22B 37/002 165/11.2 |
| 4,966,746 A | | 10/1990 | Richardson et al. |
| 5,009,105 A | | 4/1991 | Richardson et al. |
| H1115 H | * | 12/1992 | Nachbar ....................... 122/379 |
| 5,169,593 A | | 12/1992 | Kazirskis et al. |
| 5,265,129 A | | 11/1993 | Brooks et al. |
| 5,575,328 A | | 11/1996 | Hyp |
| 5,586,155 A | * | 12/1996 | Erbes ................... G21C 17/003 376/249 |
| 5,742,653 A | | 4/1998 | Erbes et al. |
| 5,852,984 A | | 12/1998 | Matsuyama et al. |
| 6,595,753 B1 | | 7/2003 | Illingworth et al. |
| 6,802,693 B2 | | 10/2004 | Reinfeld et al. |
| 7,587,942 B2 | | 9/2009 | Smith et al. |
| 7,769,123 B2 | | 8/2010 | Rowell et al. |
| 8,371,025 B2 | | 2/2013 | Kramer et al. |
| 8,418,662 B2 | | 4/2013 | Kim et al. |
| 9,646,727 B2 | | 5/2017 | Smith et al. |
| 2002/0064250 A1 | | 5/2002 | Kurosawa et al. |
| 2006/0222138 A1 | | 10/2006 | Shimamura et al. |
| 2009/0314089 A1 | | 12/2009 | Brignac et al. |
| 2012/0140865 A1 | | 6/2012 | Vigliano |
| 2014/0098924 A1 | | 4/2014 | Foley |

FOREIGN PATENT DOCUMENTS

| | | |
|---|---|---|
| JP | H08-201568 A | 8/1996 |
| JP | H10319170 A | 12/1998 |
| JP | H11160295 A | 6/1999 |
| JP | 2006-308547 A | 11/2006 |
| JP | 2008008693 A | 1/2008 |
| JP | 2008145432 A | 6/2008 |
| JP | 2012-118069 A | 6/2012 |
| JP | 2015-155899 A | 8/2015 |
| JP | 2015-530602 A | 10/2015 |

* cited by examiner

METHOD FOR INSPECTING CORE SHROUD USING REMOTE OPERATED VEHICLE (ROV)

CROSS REFERENCE TO RELATED APPLICATION

This application is a divisional of U.S. application Ser. No. 15/237,979, filed on Aug. 16, 2016, the entire contents of which is hereby incorporated by reference.

BACKGROUND

1. Field

Example embodiments generally relate to remotely operated vehicles ("ROVs") for inspecting core shrouds of nuclear power plants. Example embodiments also relate to systems for inspecting core shrouds of nuclear power plants. Additionally, example embodiments relate to methods for inspecting core shrouds of nuclear power plants.

2. Description of Related Art

In many applications, such as nuclear reactors, steam driven turbines, or water deaerators, high-temperature water may adversely affect the associated structures by contributing to stress corrosion cracks, corrosion, erosion, and so forth. For example, high temperature waters may contribute to stress corrosion cracking ("SCC") in materials, such as carbon steels, alloy steels, stainless steels, nickel-based alloys, cobalt-based alloys, and zirconium-based alloys. SCC may preferentially occur with certain combinations of alloys, environment, and stress.

As would be understood by a person having ordinary skill in the art ("PHOSITA"), SCC may include cracks propagated by static or dynamic tensile stresses acting in combination with corrosion at crack tips. These stresses may result or originate from differences in thermal expansion or contraction between components, relatively high or varying operating pressures, or various processes performed during the manufacture and assembly of the components or system. For example, residual stresses often result from cold working, grinding, machining, and other thermo-mechanical metal treatments. Water chemistry, welding, heat treatment, and radiation may also increase the susceptibility of metal or alloy component to SCC. SCC may be transgranular or intergranular in nature.

SCC may occur at greater rates under various conditions, such as the presence of oxygen, high radiation flux, and so forth. In nuclear reactors such as a pressurized water reactor ("PWR") or a boiling water reactor ("BWR"), high radiation flux may cause radiolytic decomposition of the reactor coolant (water); this decomposition may produce oxygen, hydrogen peroxide, short-lived radicals, and various oxidizing species. These products of radiolytic decomposition may promote SCC in the various system components, such as pipes, pumps, valves, turbines, and so forth. Operating temperature and pressure for a BWR may be about 300° C. and about 10 MPa, and those for a PWR may be about 325° C. and about 15 MPa. Thus, the operating environment for BWRs and PWRs may increase the risk of having SCC issues in nuclear reactor components.

The microstructure of metals and alloys may include grains separated by grain boundaries. Intergranular stress corrosion cracking ("IGSCC") may be a more localized SCC attack along or adjacent to grain boundaries, with the bulk of the grains themselves remaining largely unaffected. IGSCC may be associated with chemical segregation effects (e.g., impurity enrichment at grain boundaries) or with specific phases precipitated at grain boundaries.

Irradiation assisted stress corrosion cracking ("IASCC") may refer to acceleration of SCC by irradiation (e.g., irradiation-induced changes that may involve microstructure changes, microchemical changes, and compositional changes by transmutation). IASCC may result from the effects of beta radiation, gamma radiation, neutron radiation, or other particle radiation (e.g., ions). However, for BWRs and PWRs, IASCC may be primarily due to neutron radiation.

Due to the serious nature of IASCC, the Nuclear Regulatory Commission ("NRC") commissioned a series of studies over about a ten-year period. Some of the reports coming out of these studies included NUREG/CR 5608, "Irradiation-Assisted Stress Corrosion Cracking of Model Austenitic Stainless Steels Irradiated in the Halden Reactor"; NUREG/CR-6892, "Fracture Toughness and Crack Growth Rates of Irradiated Austenitic Stainless Steels"; NUREG/CR-6687, "Irradiation-Assisted Stress Corrosion Cracking of Model Austenitic Stainless Steel Alloys"; NUREG/CR-6915, "Irradiation-Assisted Stress Corrosion Cracking of Austenitic Stainless Steels and Alloy 690 from Halden Phase-II Irradiations"; NUREG/CR-6960, "Crack Growth Rates and Fracture Toughness of Irradiated Austenitic Stainless Steels in BWR Environments"; and NUREG/CR-7018, "Irradiation-Assisted Stress Corrosion Cracking of Austenitic Stainless Steels in BWR Environments".

FIG. 1 is a sectional view, with parts cut away, of reactor pressure vessel ("RPV") 100 in a related art BWR.

During operation of the BWR, coolant water circulating inside RPV 100 may be heated by nuclear fission produced in core 102. Feedwater may be admitted into RPV 100 via feedwater inlet 104 and feedwater sparger 106 (a ring-shaped pipe that may include apertures for circumferentially distributing the feedwater inside RPV 100). The feedwater from feedwater sparger 106 may flow down through downcomer annulus 108 (an annular region between RPV 100 and core shroud 110).

Core shroud 110 may be a stainless steel cylinder that surrounds core 102. Core 102 may include a multiplicity of fuel bundle assemblies 112 (two 2×2 arrays, for example, are shown in FIG. 1). Each array of fuel bundle assemblies 112 may be supported at or near its top by top guide 114 and/or at or near its bottom by core plate 116. Top guide 114 may provide lateral support for the top of fuel bundle assemblies 112 and/or may maintain correct fuel-channel spacing to permit control rod insertion.

The feedwater/coolant water may flow downward through downcomer annulus 108 and/or into core lower plenum 118. The coolant water in core lower plenum 118 may in turn flow up through core 102. The coolant water may enter fuel assemblies 112, wherein a boiling boundary layer may be established. A mixture of water and steam may exit core 102 and/or may enter core upper plenum 120 under shroud head 122. Core upper plenum 120 may provide standoff between the steam-water mixture exiting core 102 and entering standpipes 124. Standpipes 124 may be disposed atop shroud head 122 and/or in fluid communication with core upper plenum 120.

The steam-water mixture may flow through standpipes 124 and/or may enter steam separators 126 (which may be, for example, of the axial-flow, centrifugal type). Steam separators 126 may substantially separate the steam-water mixture into liquid water and steam. The separated liquid water may mix with feedwater in mixing plenum 128. This mixture then may return to core 102 via downcomer annulus 108. The separated steam may pass through steam dryers 130 and/or may enter steam dome 132. The dried steam may be withdrawn from RPV 100 via steam outlet 134 for use in turbines and other equipment (not shown).

The BWR also may include a coolant recirculation system that provides the forced convection flow through core 102 necessary to attain the required power density. A portion of the water may be sucked from the lower end of downcomer annulus 108 via recirculation water outlet 136 and/or may be forced by a centrifugal recirculation pump (not shown) into a plurality of jet pump assemblies 138 (only one of which is shown) via recirculation water inlets 140. Jet pump assemblies 138 may be circumferentially distributed around core shroud 110 and/or may provide the required reactor core flow.

As shown in FIG. 1, a related art jet pump assembly 138 may include a pair of inlet mixers 142. A related art BWR may include 16 to 24 inlet mixers 142. Each inlet mixer 142 may have an elbow 144 welded to it that receives water from a recirculation pump (not shown) via inlet riser 146. An example inlet mixer 142 may include a set of five nozzles circumferentially distributed at equal angles about the axis of inlet mixer 142. Each nozzle may be tapered radially inwardly at its outlet. Jet pump assembly 138 may be energized by these convergent nozzles. Five secondary inlet openings may be radially outside of the nozzle exits. Therefore, as jets of water exit the nozzles, water from downcomer annulus 108 may be drawn into inlet mixer 142 via the secondary inlet openings, where it may be mixed with coolant water from the recirculation pump. The coolant water then may flow into diffuser 148.

FIG. 2 is a schematic diagram showing a developed azimuthal view of the interior of a related BWR core shroud that comprises a plurality of shell sections, having vertical seam welds, that are welded together, one upon the next, by horizontal seam welds.

As shown in FIG. 2, core shroud 200 may comprise first shell sections 202a and 202b, second shell sections 204a and 204b, third shell sections 206a and 206b, fourth shell sections 208a and 208b, and fifth shell sections 210a, 210b, and 210c. Core shroud 200 may be supported by shroud supports 212a, 212b, and 212c, as well as shroud support plate 214.

Shroud supports 212a, 212b, and 212c may be joined together using vertical seam welds V12, V13, and V14, and also may be joined using horizontal seam weld H8 to shroud support plate 214.

Fifth shell sections 210a, 210b, and 210c may be joined together using vertical seam welds V9, V10, and V11 to form a lower shell section (e.g., lower barrel) of core shroud 200, and also may be joined using horizontal seam weld H7 to shroud supports 212a, 212b, and 212c.

Fourth shell sections 208a and 208b may be joined together using vertical seam welds V7 and V8 to form a bottom mid-core shell section (e.g., bottom mid-core barrel) of core shroud 200, and also may be joined using horizontal seam welds H6A and H6B to fifth shell sections 210a, 210b, and 210c. Horizontal seam weld H6A may represent the joining of fourth shell sections 208a and 208b to core plate support ring 216; horizontal seam weld H6B may represent the joining of core plate support ring 216 to fifth shell sections 210a, 210b, and 210c.

Third shell sections 206a and 206b may be joined together using vertical seam welds V5 and V6 to form a middle mid-core shell section (e.g., middle mid-core barrel) of core shroud 200, and also may be joined using horizontal seam weld H5 to fourth shell sections 208a and 208b.

Second shell sections 204a and 204b may be joined together using vertical seam welds V3 and V4 to form a top mid-core shell section (e.g., top mid-core barrel) of core shroud 200, and also may be joined using horizontal seam weld H4 to third shell sections 206a and 206b.

As known to a PHOSITA, the bottom mid-core barrel, middle mid-core barrel, and top mid-core barrel may be collectively referred to as the "mid barrel" of core shroud 200.

First shell sections 202a and 202b may be joined together using vertical seam welds V1 and V2 to form an upper shell section (e.g., upper barrel) of core shroud 200, and also may be joined using horizontal seam welds H2 and H3 to second shell sections 204a and 204b. Horizontal seam weld H2 may represent the joining of first shell sections 202a and 202b to top guide support ring 218; horizontal seam weld H3 may represent the joining of top guide support ring 218 to second shell sections 204a and 204b.

Horizontal seam weld H1 may represent the joining of shroud flange 220 to first shell sections 202a and 202b.

As known to a PHOSITA, the upper barrel may have a first radius R1, the mid barrel may have a second radius R2, and the lower barrel may have a third radius R3, such that R1>R2>R3. In such cases, there may be a first overhanging ledge at horizontal seam welds H2 and H3, and a second overhanging ledge at horizontal seam welds H6A and H6B (other overhanging ledges may exist, for example, at horizontal seam weld H7). The first and second overhanging ledges may complicate the design of systems for inspecting core shroud 200 and the development of methods for inspecting core shroud 200.

As known to a PHOSITA, the relative offsets in vertical seam welds V1-V14 attempt to ensure that a crack in a single vertical seam weld cannot propagate over a significant distance (e.g., all the way from horizontal seam weld H1 to horizontal seam weld H8). However, horizontal seam weld H1-H8 do not have such an offset arrangement.

Although SCC, IGSCC, and IASCC have been studied, no "cure" has been found. As a result, cracks continue to initiate and propagate in components of nuclear reactors. Core shrouds may be particularly susceptible due to their extremely high neutron fluence as the nuclear reactor ages. For example, in core shroud 200, the active fuel in an associated core 102 may extend vertically from between horizontal seam welds H5 and H6A to about horizontal seam weld H2 or H3. Thus, horizontal seam welds H2, H3, H4, and H5, and vertical seam welds V3, V4, V5, V6, V7, and V8, all may be described as being subject to extremely high neutron fluence.

Inspection of the welds of core shroud 110 may be performed during outages of an associated reactor unit using, for example, visual inspection methods and ultrasonic ("UT") probes. The UT probes may measure the length and depth of cracks in the welds.

Structures near core shroud 110, such as jet pump assemblies 138 may make it difficult for currently available inspection devices to access certain weld locations on core shroud 110. The radius of core shroud 110 may vary not only from one nuclear power plant to another, but may vary in a single core shroud 110 (generally the radii increase with height of core shroud 110, changing at one or more horizontal seam welds/ledges, as known to a PHOSITA). And because different nuclear reactors have different layouts, it may be difficult to design a single device capable of inspecting all of the core shrouds of a given operator of nuclear power plants.

Inspection tooling may generally be rigorously designed to minimize the chance for debris to be dropped or lost in a nuclear reactor. Many inspection tools are custom-designed to maximize accessibility while preventing loss of material and minimizing breakdowns. Breakdowns of tooling can be costly in terms of increased time to inspect the nuclear reactor.

Typical ROVs used in underwater exploration generally may be too large for use in inspecting core shroud 110. Thrust fans may be used to hold a smaller ROV against core shroud 110, but the thrust fans needed to produce the required thrust force may increase the size of the ROV, thereby limiting its accessibility.

Thus, a need exists for improved systems and methods that may provide the ability to inspect core shrouds of nuclear power plants to detect cracks and to monitor crack propagation.

Related art systems and methods for inspecting core shrouds of nuclear power plants are discussed, for example, in U.S. Pat. No. 3,987,666 to Blanc et al. ("the '666 patent"); U.S. Pat. No. 4,330,865 to Hyde et al. ("the '865 patent"); U.S. Pat. No. 4,966,746 to Richardson et al. ("the '746 patent"); U.S. Pat. No. 5,009,105 to Richardson et al. ("the '105 patent"); U.S. Pat. No. 5,169,593 to Kazirskis et al. ("the '593 patent"); U.S. Pat. No. 5,586,155 to Erbes et al. ("the '155 patent"); U.S. Pat. No. 5,852,984 to Matsuyama et al. ("the '984 patent"); U.S. Pat. No. 7,587,942 B2 to Smith et al. ("the '942 patent"); U.S. Pat. No. 7,769,123 B2 to Rowell et al. ("the '123 patent"); U.S. Patent Publication No. 2002/0064250 A1 to Kurosawa et al. ("the '250 publication"); U.S. Patent Publication No. 2009/0314089 A1 to Brignac et al. ("the '089 publication"); and U.S. Patent Publication No. 2012/0140865 A1 to Vigliano ("the '865 publication").

The disclosures of the '746 patent, the '105 patent, the '593 patent, the '155 patent, the '942 patent, and the '123 patent are incorporated in this application by reference in their entirety. Similarly, the disclosures of the '865 publication are incorporated in this application by reference in its entirety.

SUMMARY

Some example embodiments of the present application may provide ROVs for inspecting core shrouds of nuclear power plants.

Some example embodiments may provide systems for inspecting core shrouds of nuclear power plants.

Some example embodiments may provide methods for inspecting core shrouds of nuclear power plants.

In some example embodiments, an ROV for inspecting a core shroud having an outer surface, may comprise: a body configured to be operatively connected to a tether; and/or a sensor, configured to be operatively connected to the body, and configured to provide inspection information of the core shroud. The tether may be configured to provide vertical position information for the ROV relative to the outer surface of the core shroud.

In some example embodiments, the tether may be further configured to support a weight of the ROV.

In some example embodiments, the tether may be further configured to support a submerged weight of the ROV.

In some example embodiments, the body may comprise one or more devices configured to provide thrust to move the ROV relative to a medium in which the ROV is submerged.

In some example embodiments, the body may comprise one or more devices configured to create a vacuum between a portion of the ROV and the outer surface of the core shroud.

In some example embodiments, the body may comprise one or more devices configured to maintain a vacuum between a portion of the ROV and the outer surface of the core shroud.

In some example embodiments, the sensor may comprise an ultrasonic ("UT") probe.

In some example embodiments, the sensor may be configured to move relative to the body to allow inspection of the core shroud in a horizontal orientation of the sensor, a vertical orientation of the sensor, or at orientations of the sensor between the horizontal orientation and the vertical orientation.

In some example embodiments, the sensor may be configured to move relative to the body to allow inspection of horizontal welds of the core shroud, vertical welds of the core shroud, and welds of the core shroud at angles in between horizontal and vertical.

In some example embodiments, a system for inspecting a core shroud having an outer surface may comprise: a trolley; an arm; a tether; and/or a remotely operated vehicle (ROV) for inspecting the core shroud. The ROV may comprise: a body configured to be operatively connected to the tether; and/or a sensor, configured to be operatively connected to the body, and configured to provide inspection information of the core shroud. The arm may be configured to be operatively connected to the trolley. The ROV may be configured to be operatively connected to the arm via the tether. The tether may be configured to provide vertical position information for the ROV relative to the outer surface of the core shroud.

a trolley; an arm operatively connected to the trolley; and/or an ROV for inspecting the core shroud. The ROV may comprise: a body; a sensor, operatively connected to the body, configured to provide inspection information of the core shroud; and/or a tether configured to provide vertical position information for the ROV relative to the outer surface of the core shroud. The ROV may be operatively connected to the arm via the tether.

In some example embodiments, the ROV may be configured to be operatively connected to the arm and the trolley via the tether.

In some example embodiments, the trolley may be configured to drive horizontally around the core shroud.

In some example embodiments, the ROV may be configured to move horizontally around the core shroud as the trolley is driven horizontally around the core shroud.

In some example embodiments, the ROV may be configured to move horizontally around the core shroud independent of the driving of the trolley horizontally around the core shroud.

In some example embodiments, the ROV may be configured to move horizontally, vertically, or horizontally and vertically relative to the core shroud independent of the driving of the trolley horizontally around the core shroud.

In some example embodiments, the trolley may be configured to drive around the core shroud on a steam dam of the core shroud.

In some example embodiments, the core shroud may comprise an upper portion having a first radius from an axis of the core shroud and a lower portion having a second radius from the axis of the core shroud. The second radius may be smaller than the first radius. The arm may be configured to extend so that the ROV is at a level of the lower portion of the core shroud. The arm may be further configured to move the ROV closer to the axis of the core shroud than the first radius.

In some example embodiments, a method for inspecting a core shroud having an outer surface may comprise: installing a system for inspecting the core shroud on the core shroud; driving the system horizontally around the core shroud; and/or using a sensor of the system to inspect the core shroud. The system may comprise: a trolley; an arm; a tether; and/or a remotely operated vehicle (ROV) for inspecting the core shroud. The ROV may comprise: a body configured to be operatively connected to the tether; and/or the sensor, configured to be operatively connected to the body, and configured to provide inspection information of the core shroud. The arm may be configured to be operatively connected to the trolley. The ROV may be configured to be operatively connected to the arm via the tether. The tether may be configured to provide vertical position information for the ROV relative to the outer surface of the core shroud.

In some example embodiments, the installing of the system for inspecting the core shroud may comprise installing the trolley on a steam dam of the core shroud.

In some example embodiments, the driving of the system horizontally around the core shroud may comprise driving the trolley horizontally around a steam dam of the core shroud.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Figure 1:
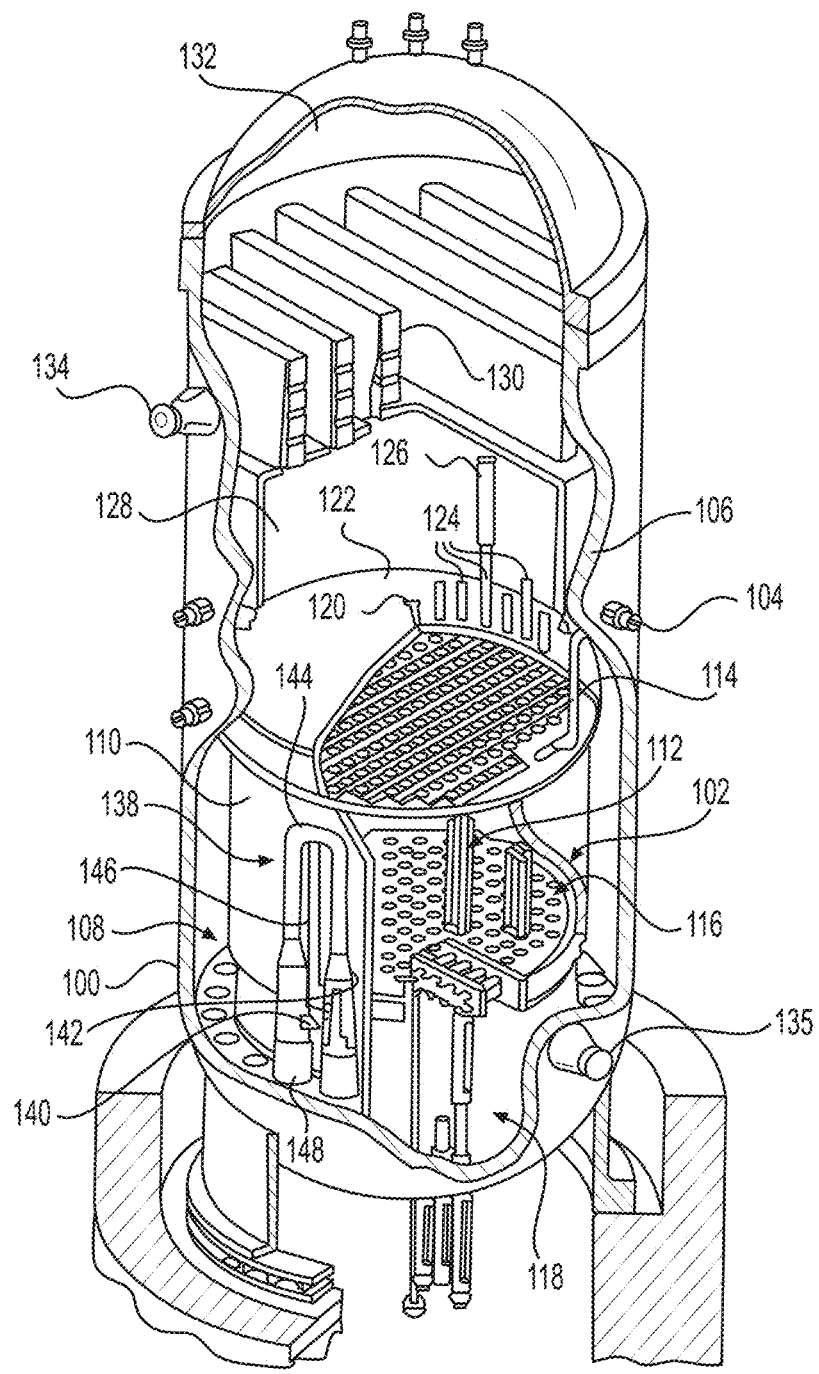
FIG. 1 is a sectional view, with parts cut away, of an RPV in a related art BWR.
Figure 2:
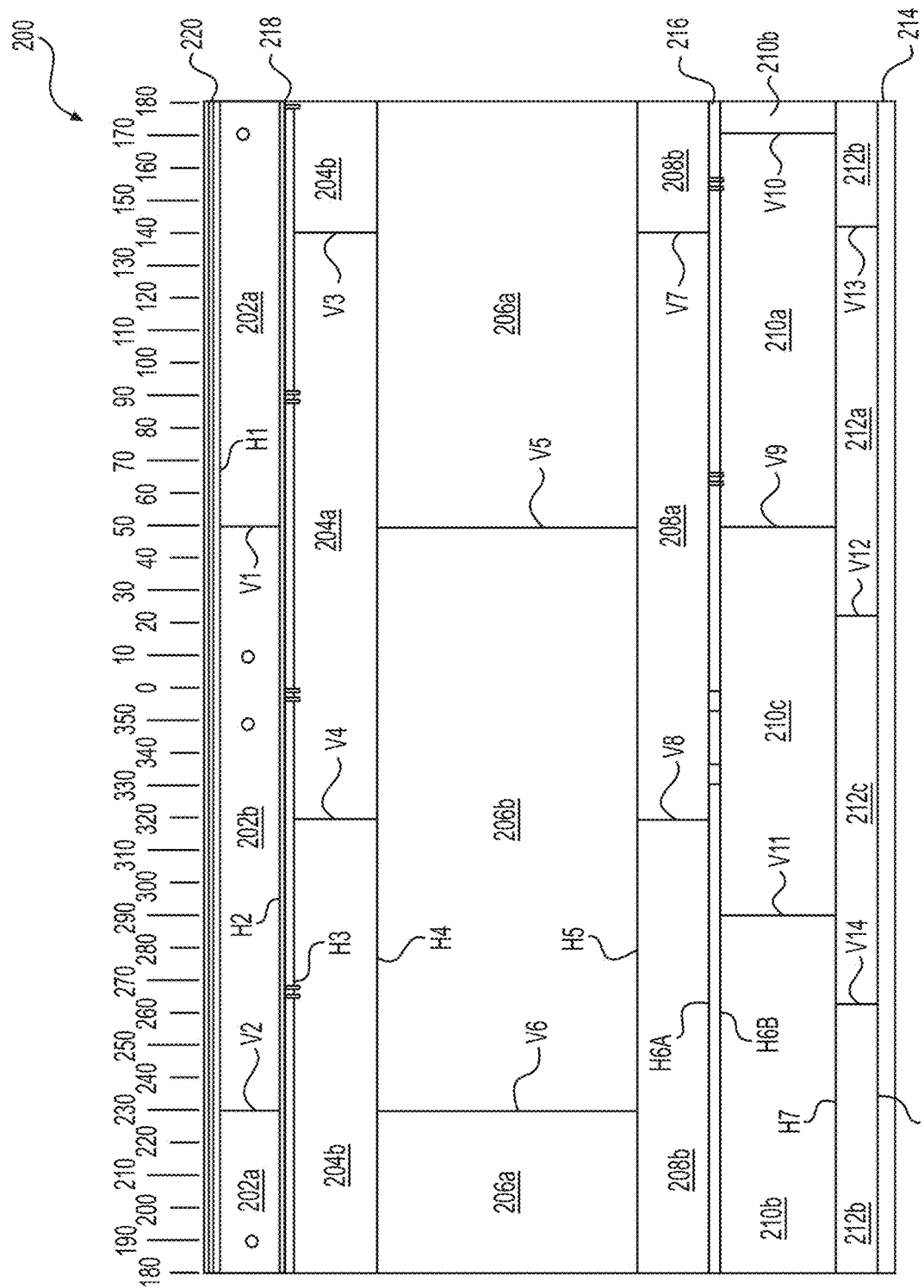
FIG. 2 is a schematic diagram showing a developed azimuthal view of the interior of a related BWR core shroud that comprises a plurality of shell sections, having vertical seam welds, that are welded together, one upon the next, by horizontal seam welds.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

The term "heat-affected zone" means an area of metal that has had its microstructure and properties altered by welding.

Reference will now be made to example embodiments, which are illustrated in the accompanying drawings, wherein like reference numerals may refer to like components throughout.

Figure 3A:
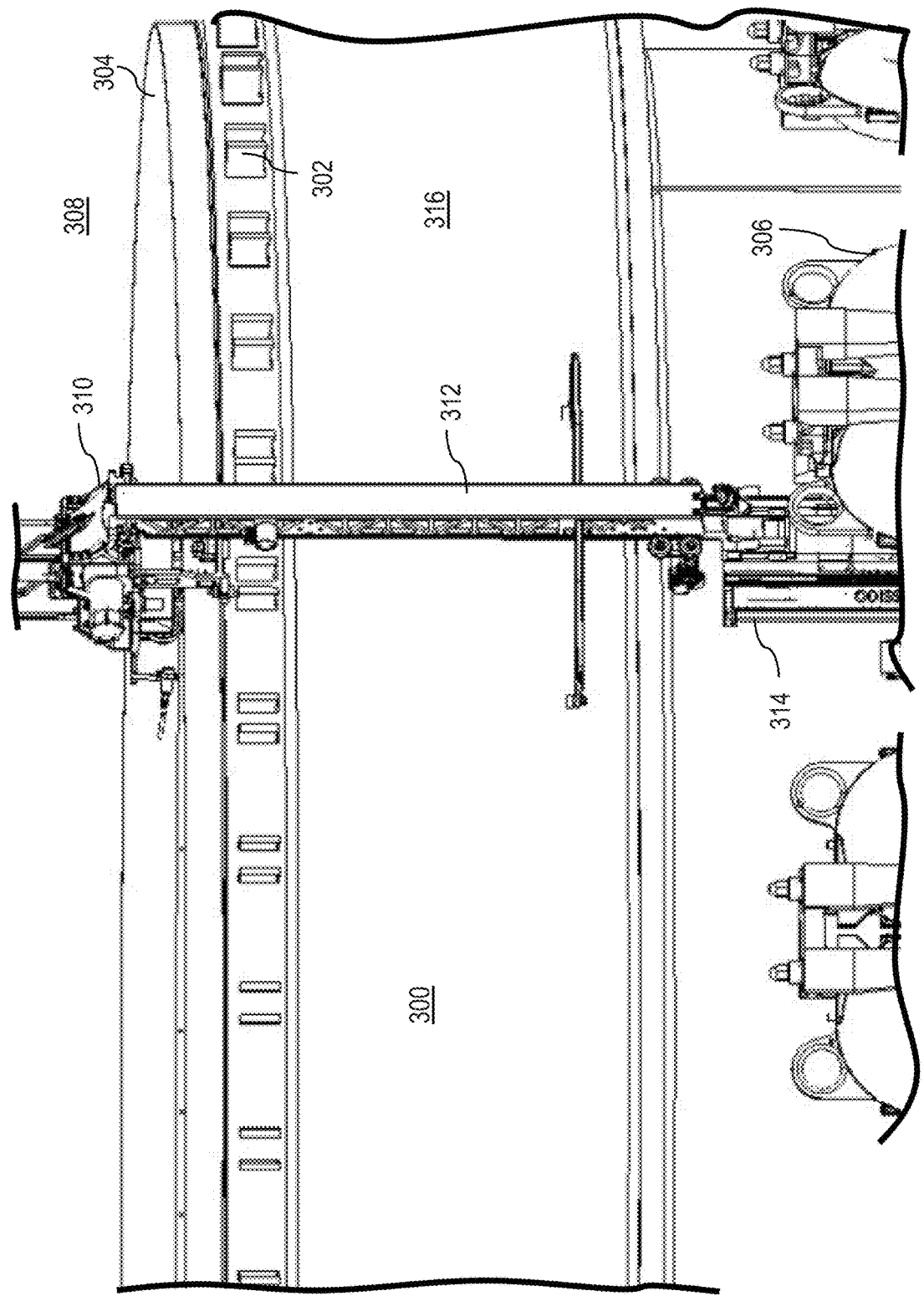
FIG. 3A is a front perspective view of a system for inspecting core shrouds from outer surfaces of the core shrouds, according to some example embodiments.
Figure 3B:
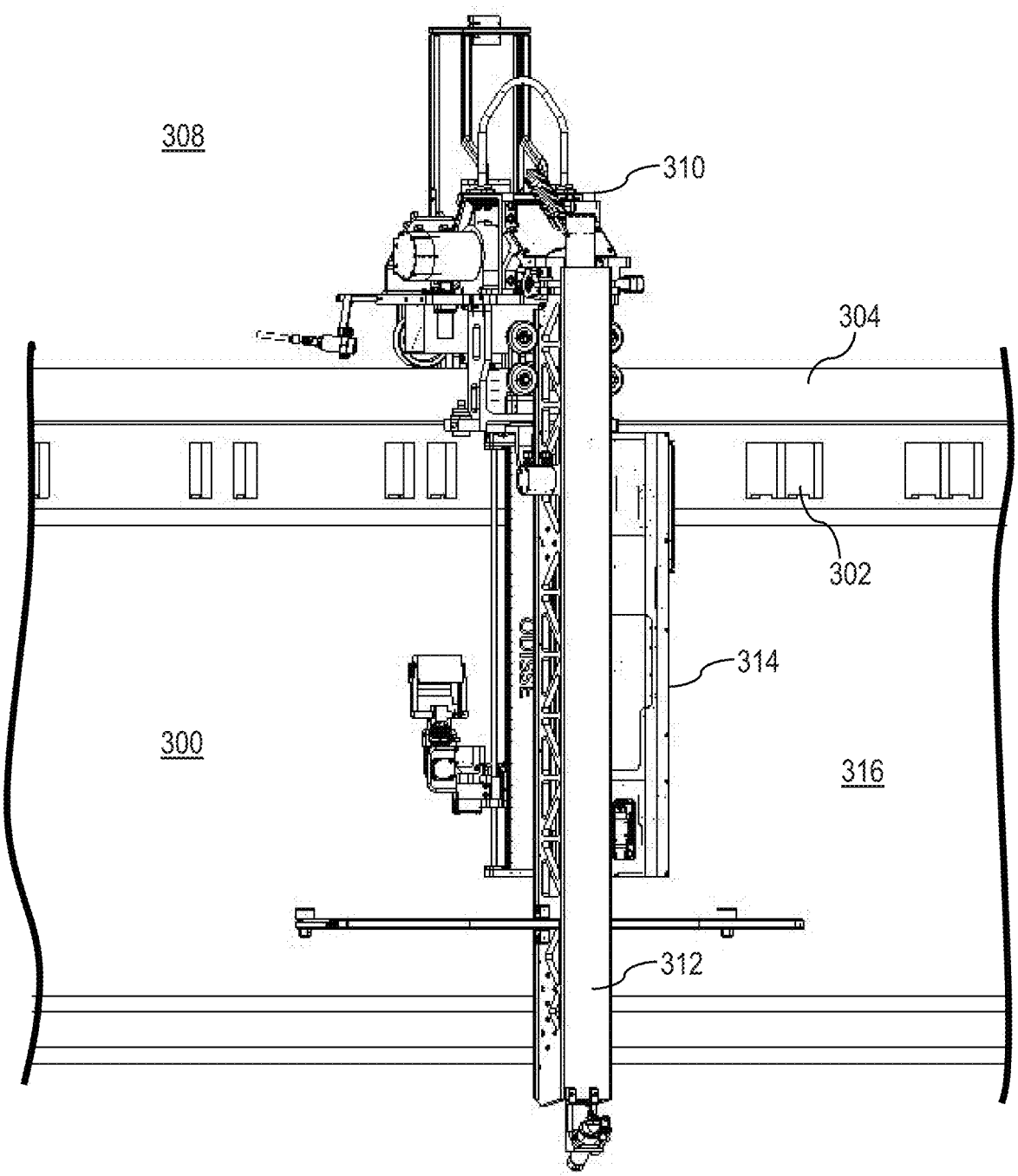
FIG. 3B is a front view of the system for inspecting core shrouds from the outer surfaces of the core shrouds, according to some example embodiments.

FIG. 3A is a perspective view of a system for inspecting core shrouds from outer surfaces of the core shrouds, according to some example embodiments; and FIG. 3B is a front view of the system for inspecting core shrouds from the outer surfaces of the core shrouds, according to some example embodiments.

As shown in FIG. 3A, core shroud 300 may comprise shroud head bolt lugs 302 and steam dam 304. Jet pump assemblies 306 may surround core shroud 300. Core shroud 300 may comprise various shell sections (e.g., lower barrel, mid barrel, and upper barrel). Although the various shell sections of core shroud 300 may generally share a common axis, the shell sections may have different radii. Generally, the radii may increase with height of core shroud 300, changing at one or more horizontal seam welds/ledges, as known to a PHOSITA.

In some example embodiments, system 308 may comprise trolley 310, arm 312 operatively connected to trolley 310, and/or ROV 314. System 308 also may comprise a tether (not shown). The tether may be considered as part of trolley 310, arm 312, ROV 314, or as a separate component. ROV 314 may be operatively connected to arm 312 by the tether.

As shown in FIG. 3A, ROV 314 may be disposed between jet pump assemblies 306 and outer surface 316 of core shroud 300. As shown in FIG. 3B, ROV 314 may be disposed above jet pump assemblies 306.

As discussed in further detail below, in some example embodiments, with system 308 installed on core shroud 300, ROV 314 may have three operating modes, a docked mode, an undocked mode, and a deployed mode.

In some example embodiments, system 308 may provide a single system and/or single configuration (e.g., right-handed or left-handed, as discussed below) for inspecting multiple core shroud geometries (e.g., constant barrel radii, varying barrel radii, horizontal ledges, obstructions, limited clearance between core shrouds and jet pump assemblies). System 308 may provide full or near-full inspection of the multiple core shroud geometries with the single system and/or single configuration.

In some example embodiments, system 308 may minimize customer impact by providing efficient and effective inspections of multiple core shroud geometries, while also providing detailed data and repeatable inspection results.

In some example embodiments, materials chosen for trolley 310, arm 312, and/or ROV 314 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal foreign material ("FM") potential. For example, materials chosen for trolley 310, arm 312, and/or ROV 314 may comprise aluminum or stainless steel.

In some example embodiments, trolley 310, arm 312, and/or ROV 314 may be designed to minimize overall size and/or weight. For example, arm 312 may comprise a truss design to reduce weight while providing required strength, sufficient rigidity, and/or limited flexibility.

In some example embodiments, system 308 may be delivered to a nuclear power plant and assembled (if required). After use, system 308 may be stored at the nuclear power plant for future inspections (this may depend, for example, on the geographic location of the nuclear power plant and/or other factors). In the alternative, system 308 may be disassembled (if required) and transferred to an off-site location (e.g., another nuclear power plant) for storage and/or other inspections.

In some example embodiments, system 308 may be installed on core shroud 300 (e.g., on steam dam 304), preferably in a fully compacted mode of system 308, discussed in further detail below. The fully compacted mode of system 308 may ensure that trolley 310, arm 312, and/or ROV 314 are above jet pump assemblies 306 during installation.

In some example embodiments, trolley 310 may drive around core shroud 300 on steam dam 304 (e.g., clockwise ("CW") or counter-clockwise ("CCW") when viewed from above). Trolley 310 may drive around core shroud 300 by shifting smoothly or by taking multiple jogging steps, whether trolley 310 is driving around steam dam 304 or ROV 314 is scanning core shroud 300. Trolley 310 may drive from a first point of core shroud 300 to a second point of core shroud 300 in a single step or in multiple steps.

In some example embodiments, ROV 314 may move around core shroud 300 by shifting smoothly or by taking multiple jogging steps, whether trolley 310 is driving around steam dam 304 or ROV 314 is scanning core shroud 300. ROV 314 may move from a first point of core shroud 300 to a second point of core shroud 300 in a single step or in multiple steps.

Figure 4A:
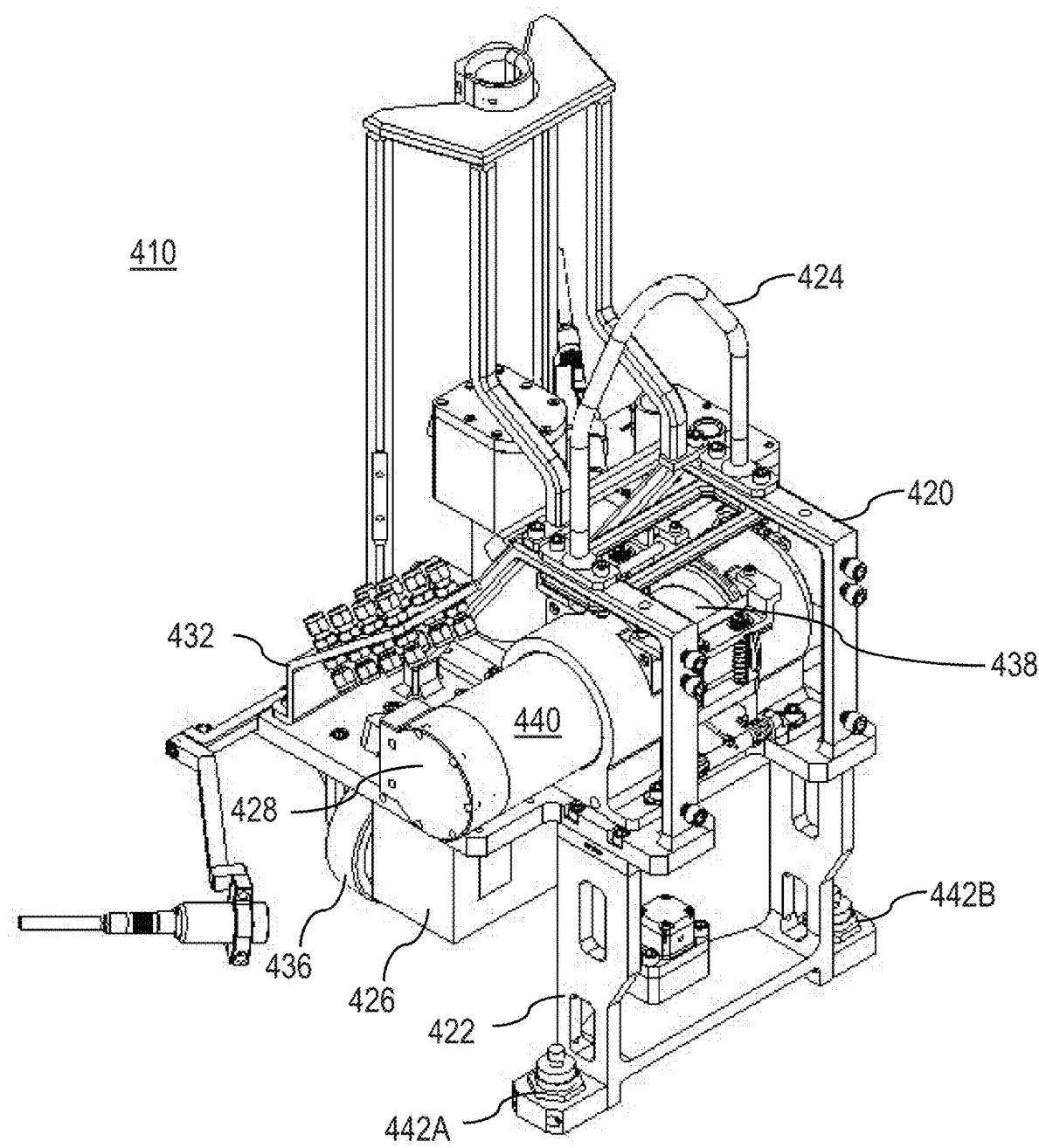
FIG. 4A is a front perspective view of a trolley, according to some example embodiments.
Figure 4B:
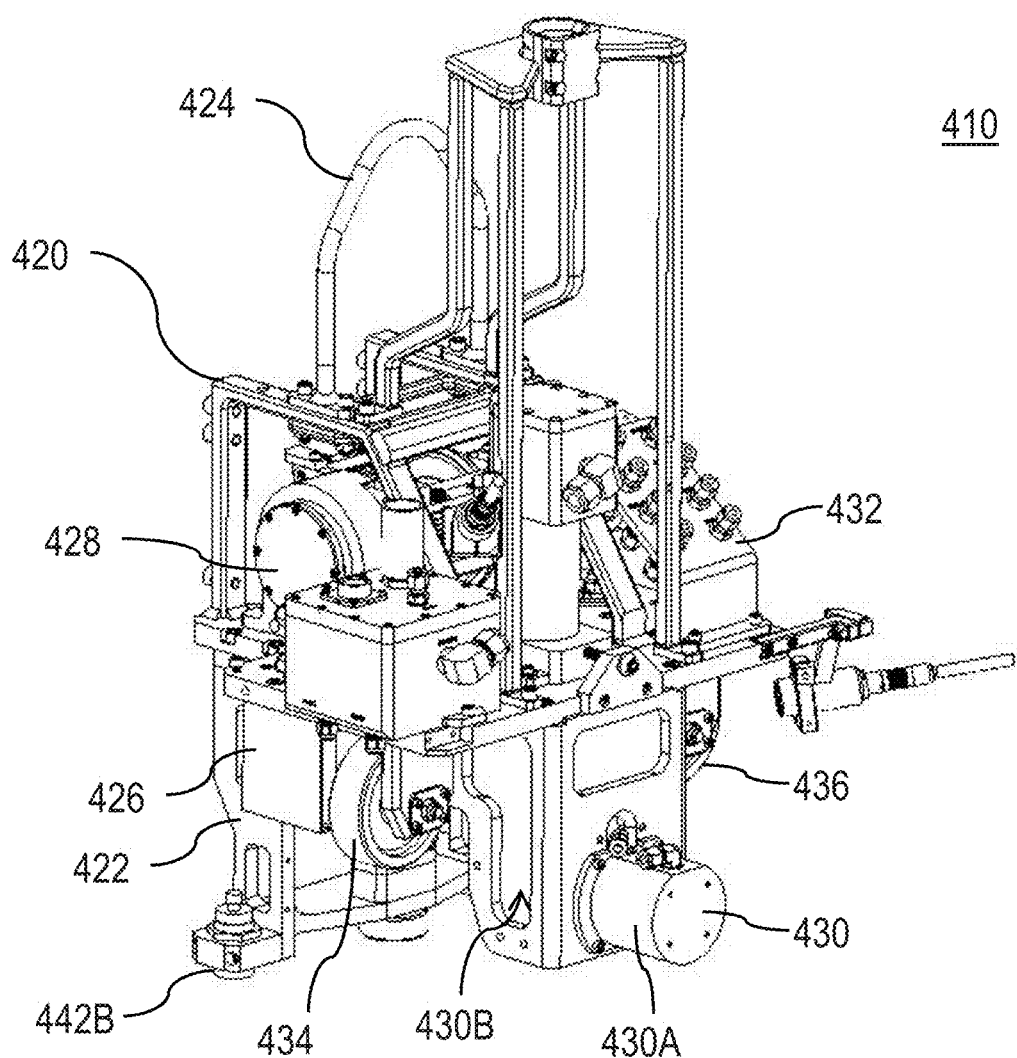
FIG. 4B is a rear perspective view of the trolley, according to some example embodiments.
Figure 4C:
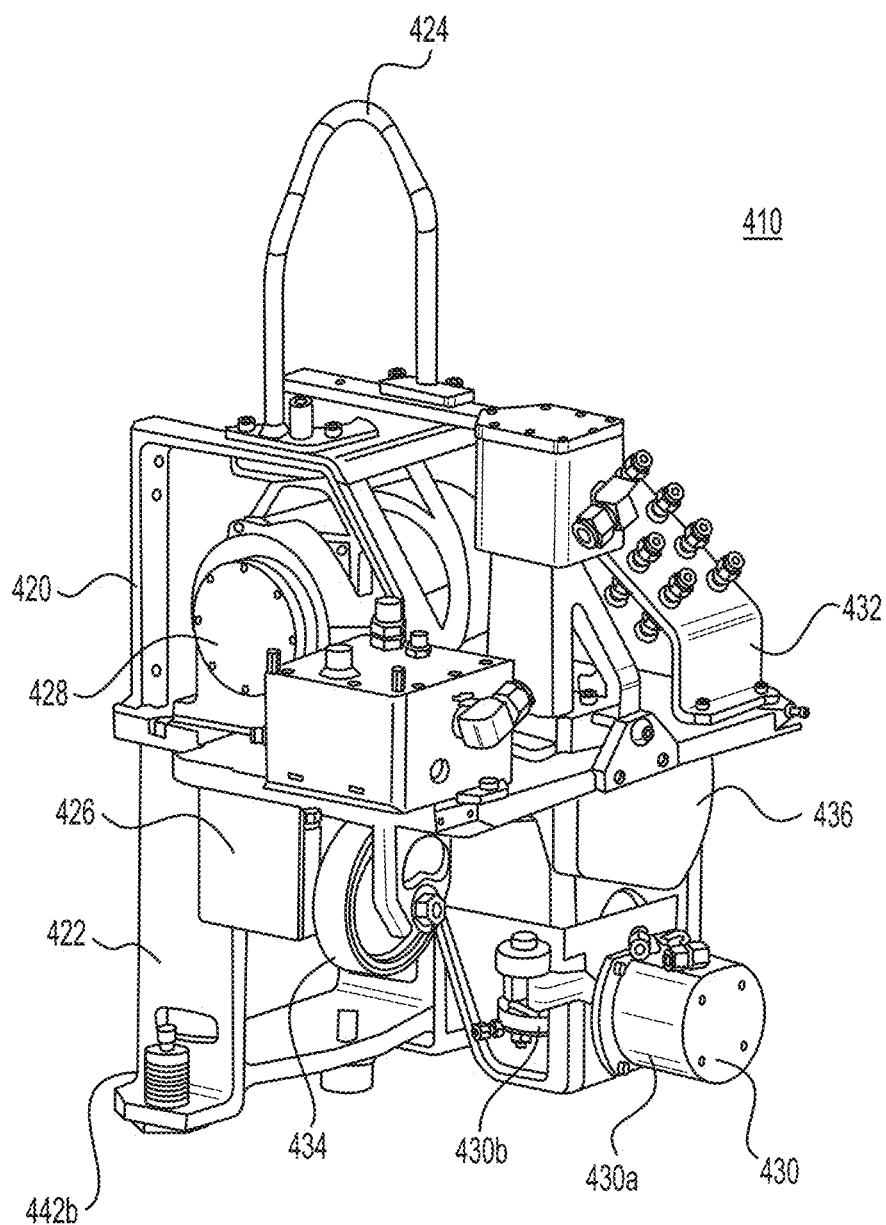
FIG. 4C is a another rear perspective view of the trolley, according to some example embodiments.

FIG. 4A is a front perspective view of a trolley, according to some example embodiments; FIG. 4B is a rear perspective view of the trolley, according to some example embodiments; FIG. 4C is a another rear perspective view of the trolley, according to some example embodiments.

In some example embodiments, trolley 410 may function as the primary attachment point when system 308 is installed on core shroud 300. For example, system 308 may be lifted, moved, and/or oriented for installation using trolley 410.

In some example embodiments, trolley 410 may be supported vertically by steam dam 304. For example, trolley 410 may be supported vertically by two wheels riding on steam dam 304.

In some example embodiments, trolley 410 may be supported horizontally, in a circumferential direction of core shroud 300, by two wheels riding on steam dam 304.

In some example embodiments, trolley 410 may be supported horizontally, in a radial direction of core shroud 300, by a first stabilizing device exerting force on a radially inner side of steam dam 304 to counteract the weight of arm 312 and/or ROV 314 on a radially outer side of steam dam 304 (this may be considered as a balancing of torques tending to cause trolley 410 to rotate about steam dam 304 with, for example, the two wheels riding on steam dam 304 as the pivot point(s)). For example, trolley 410 may be supported horizontally, in a radial direction of core shroud 300, by a stabilizing piston (e.g., pneumatically actuated) pushing a roller (e.g., horizontal, non-driven) against the radially inner side of steam dam 304.

In some example embodiments, materials chosen for trolley 410 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal FM potential. For example, materials chosen for trolley 410 may comprise aluminum or stainless steel.

In some example embodiments, trolley 410 may be designed to minimize overall size and/or weight.

In some example embodiments, trolley 410 may comprise framework 420, mounting bracket 422, handle 424, horizontal drive device 426, winch 428, first stabilizing device 430, and/or trolley junction box 432.

In some example embodiments, framework 420 may provide a foundation for attachment of various components of trolley 410, as well as for arm 312 and/or ROV 314.

In some example embodiments, mounting bracket 422 may counteract first stabilizing device 430.

In some example embodiments, handle 424 may provide an attachment point for lifting and manipulating trolley 410 (and system 308 more generally) using chain falls, cranes, grapples, handling poles, and similar conventional devices. Trolley 410 also may comprise other such attachment points, such as eye hooks, lifting eyes, or lifting tubes, as known to a PHOSITA.

As shown in FIG. 4B, horizontal drive device 426 may comprise first wheel 434 and/or second wheel 436. Horizontal drive device 426 may further comprise a first motor (not shown), a drive belt (not shown), and a drive control (not shown). The first motor may be, for example, a direct current ("DC") brush motor with a first gearhead (not shown) and first feedback device (e.g., encoder, resolver) (not shown). The drive control may cause the first gearhead to move the drive belt which, in turn, may drive first wheel 434 and/or second wheel 436 so as to move trolley 410 along steam dam 304 (e.g., CW or CCW). Reversing the rotation direction of the first motor may reverse the horizontal direction of movement of trolley 410 along steam dam 304, as known to a PHOSITA. The first feedback device (e.g., encoder, resolver) may provide gross horizontal positioning of trolley 410 relative to core shroud 300.

As shown in FIG. 4A, winch 428 may comprise a drum (not shown) and second motor 440. Winch 428 may spool the tether (not shown) using the drum (hidden under cover 438), driven by second motor 440, such that spooling in the tether may raise ROV 314 and spooling out the tether may lower ROV 314. In this way, winch 428 may control, at least in part, vertical position of ROV 314 relative to core shroud 300. Second motor 440 may be, for example, a DC brush motor with a second gearhead (e.g., harmonic gear) (not shown) and second feedback device (e.g., encoder, resolver) (not shown). Reversing the rotation direction of second motor 440 may reverse the vertical direction of movement of ROV 314 relative to core shroud 300, as known to a PHOSITA. The tether may be configured to provide gross vertical positioning of ROV 314 relative to outer surface 316 of core shroud 300.

In some example embodiments, cover 438 and/or a plate (not shown) may be used to keep the tether from bunching up (e.g., "birdnesting") on winch 428. One or both of cover 438 and the plate may be urged toward the drum (e.g., by spring-loading) to control the tether, particularly when the tether is not in a tension condition.

In some example embodiments, first stabilizing device 430 may comprise stabilizing piston 430A and roller 430B. As shown in FIG. 4C, roller 430B may be oriented horizontally. Roller 430B may be non-driven. Stabilizing piston 430A may be, for example, pneumatically actuated to push roller 430B against the radially inner side of steam dam 304. When horizontal drive device 426 drives first wheel 434 and/or second wheel 436 so as to move trolley 410 along steam dam 304 (e.g., CW or CCW), roller 430B may ride against the radially inner side of steam dam 304.

In some example embodiments, trolley junction box 432 may provide electrical connections (e.g., power, signals) between one or more umbilicals and trolley 410, ROV 314, or trolley 410 and ROV 314.

In some example embodiments, when system 308 is installed on core shroud 300, trolley 410 may move around core shroud 300 in the CW or CCW direction.

As discussed above, horizontal drive device 426 may drive first wheel 434 and/or second wheel 436 so as to move trolley 410 along steam dam 304. When trolley 410 is moving around core shroud 300 in the CW or CCW direction, trolley 410 preferably is directly above ROV 314 relative to the circumferential direction of core shroud 300. Similarly, when trolley 410 is moving around core shroud 300 in the CW or CCW direction, ROV 314 preferably is directly below trolley 410 relative to the circumferential direction of core shroud 300.

In some example embodiments, when trolley 410 is moving around core shroud 300 in the CW or CCW direction and system 308 encounters an obstruction (e.g., associated with core shroud 300, steam dam 304, and/or jet pump assemblies 306), winch 428 may be configured to spool in the tether to shift ROV 314 back to the undocked mode or docked mode (or ROV 314 may be left in the undocked mode or docked mode, if already in one of those modes). If the spooling in of the tether allows system 308 to clear the obstruction (e.g., ROV 314 is raised above the obstruction), then trolley 410 may continue to move around core shroud 300 in the CW or CCW direction. If the spooling in of the tether does not allow system 308 to clear the obstruction (e.g., core spray nozzle, feedwater inlet, steam outlet, steam pressure measurement instrument tap, water level measurement instrument tap), then system 308 may be removed from core shroud 300 (e.g., using a crane attached to handle 424), moved around the obstruction, and reinstalled on core shroud 300. ROV 314 is preferably in the docked mode during such removing, moving, and/or reinstalling.

In some example embodiments, when trolley 410 is moving around core shroud 300 in the CW or CCW direction and system 308 encounters an obstruction (e.g., associated with core shroud 300, steam dam 304, and/or jet pump assemblies 306), ROV 314 may be shifted to the deployed mode (or ROV 314 may be left in the deployed mode, if already in that mode). In the deployed mode, ROV 314 may be able to maneuver around outer surface 316 of core shroud 300 so as to continue with the operation in progress (e.g., inspection). Such maneuvering around outer surface 316 of core shroud 300 may include moving horizontally, vertically, or horizontally and vertically relative to outer surface 316 of core shroud 300. In the deployed mode, the maneuvering may be independent of the driving of trolley 410 horizontally around core shroud 300, even though ROV 314 may only drive horizontally (discounting vertical drift).

In some example embodiments, framework 420 may function as the mounting point for arm 312. Arm 312 is discussed in further detail below.

In some example embodiments, trolley 410 may comprise one or more proximity sensors 442 configured to sense metallic edges of shroud head bolt lugs 302. The sensed metallic edges of shroud head bolt lugs 302 may provide fine horizontal positioning of trolley 410 relative to core shroud 300. For example, when trolley 410 is driven around core shroud 300 in the CW or CCW direction, one or more proximity sensors 442 may sense a leading or trailing metallic edge of a shroud head bolt lug 302. Thus, each of the proximity sensors 442 may provide a data point for horizontal global position of trolley 410 at least at a leading metallic edge of the shroud head bolt lug 302, a trailing metallic edge of the shroud head bolt lug 302, or both.

In some example embodiments, one or more proximity sensors 442 may be disposed on mounting bracket 422. One or more proximity sensors 442 may comprise first proximity sensor 442A and second proximity sensor 442B. When trolley 410 is moving around core shroud 300 in the CW direction, for example, the one of first proximity sensor 442A and second proximity sensor 442B that is first to sense the leading metallic edge of one of the shroud head bolt lugs 302 may provide the data point for horizontal global position of trolley 410, while when trolley 410 is moving around core shroud 300 in the CCW direction, the other one of first proximity sensor 442A and second proximity sensor 442B may provide the data point for horizontal global position of trolley 410.

In some example embodiments, trolley 410 may comprise one or more air cylinders configured to contact a side of shroud head bolt lugs 302 with a piston (e.g., extending downward) to determine position instead of, for example, sensing shroud head bolt lugs 302 using inductance. Thus, each of the air cylinders may provide a data point for horizontal global position of trolley 410 (e.g., the position of shroud head bolt lugs 302 may be known relative to the one or more air cylinders; the position of the one or more air cylinders may be known relative to trolley 410; the position of trolley 410 may be known relative to ROV 514 using, for example, a laser line; so the position of shroud head bolt lugs 302 relative to ROV 514 may be determined).

Figure 5A:
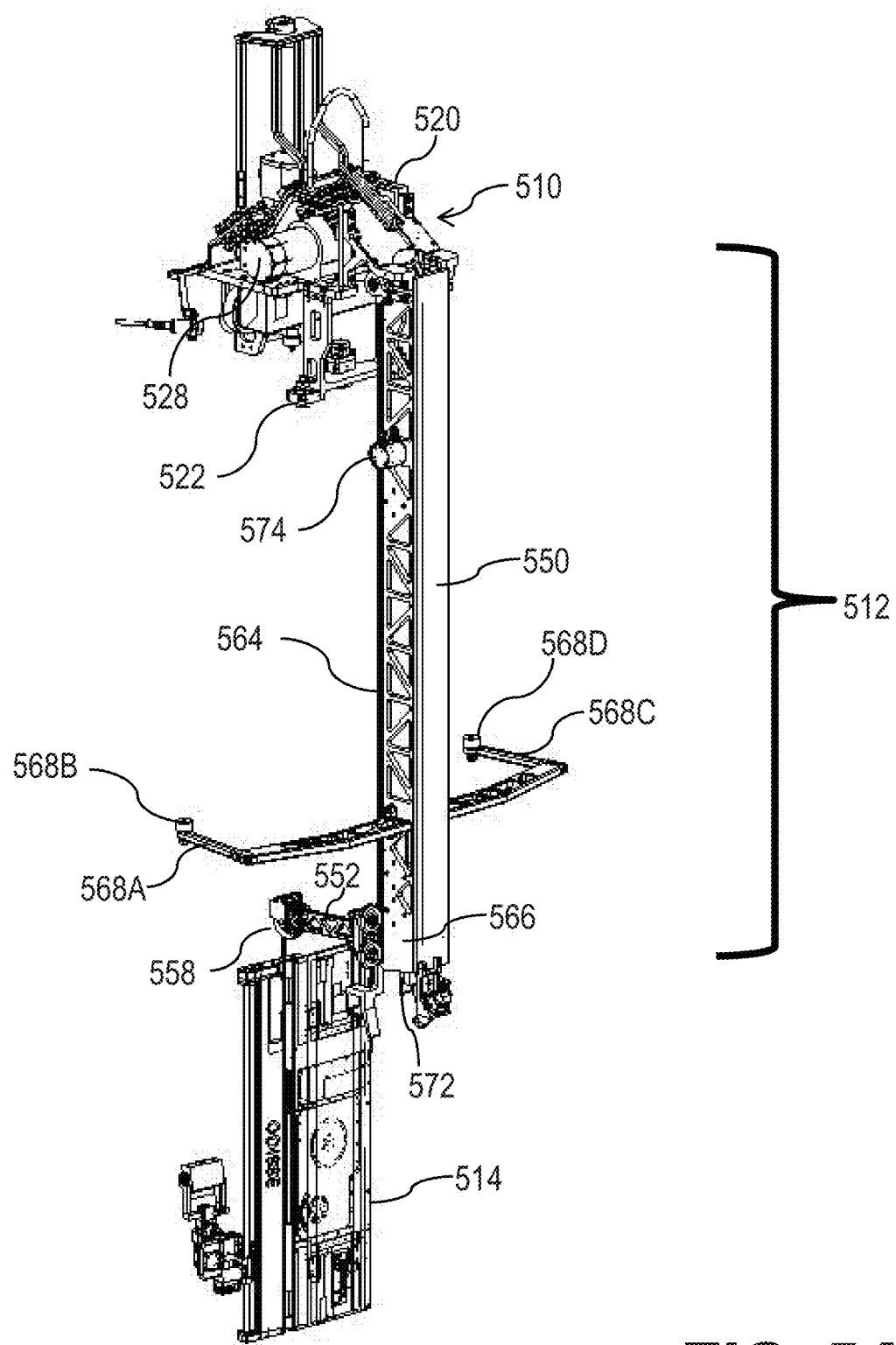
FIG. 5A is a front perspective view of an arm of a system for inspecting core shrouds from outer surfaces of the core shrouds, according to some example embodiments.
Figure 5B:
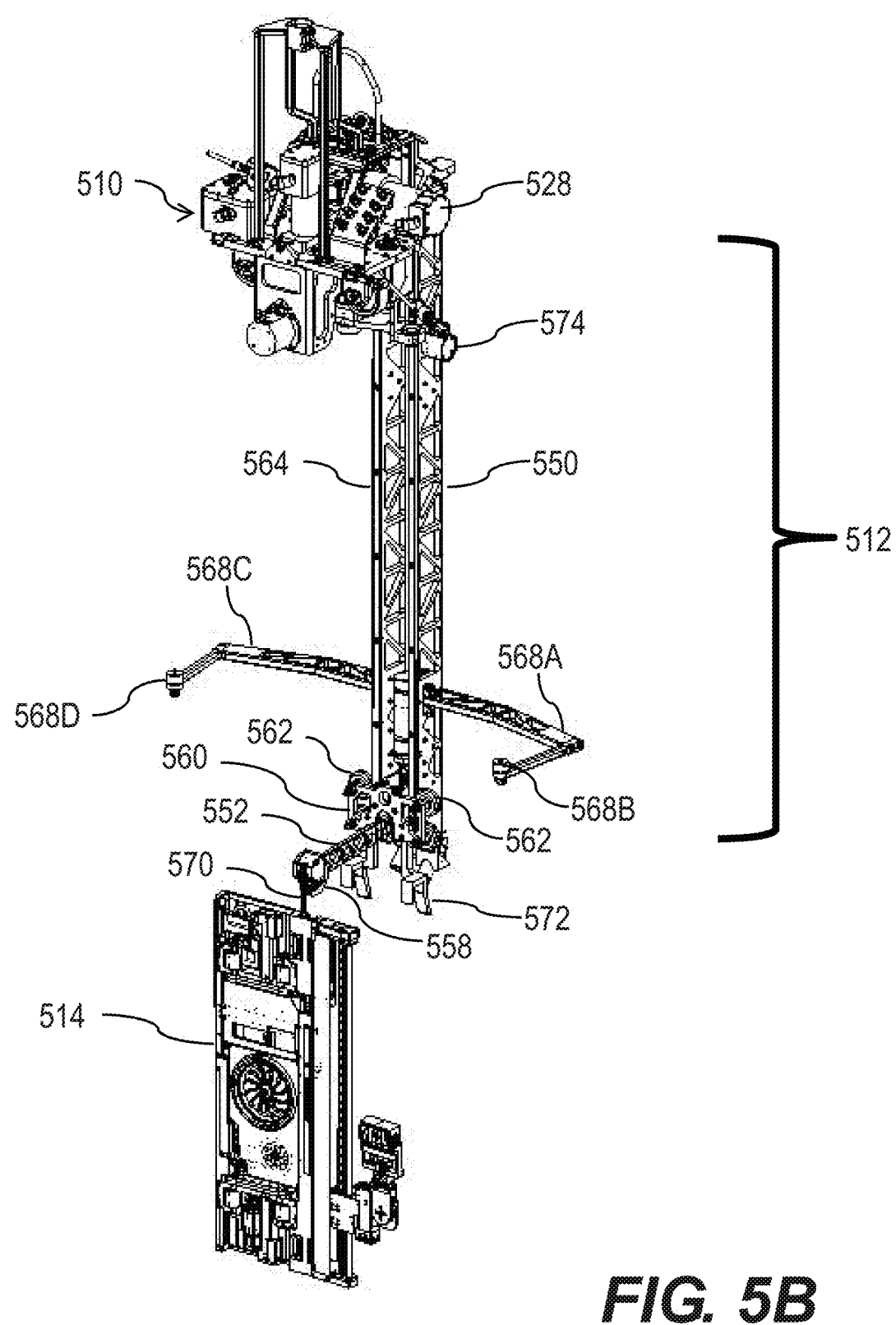
FIG. 5B is a rear perspective view of an arm of a system for inspecting core shrouds from outer surfaces of the core shrouds, according to some example embodiments.
Figure 5C:
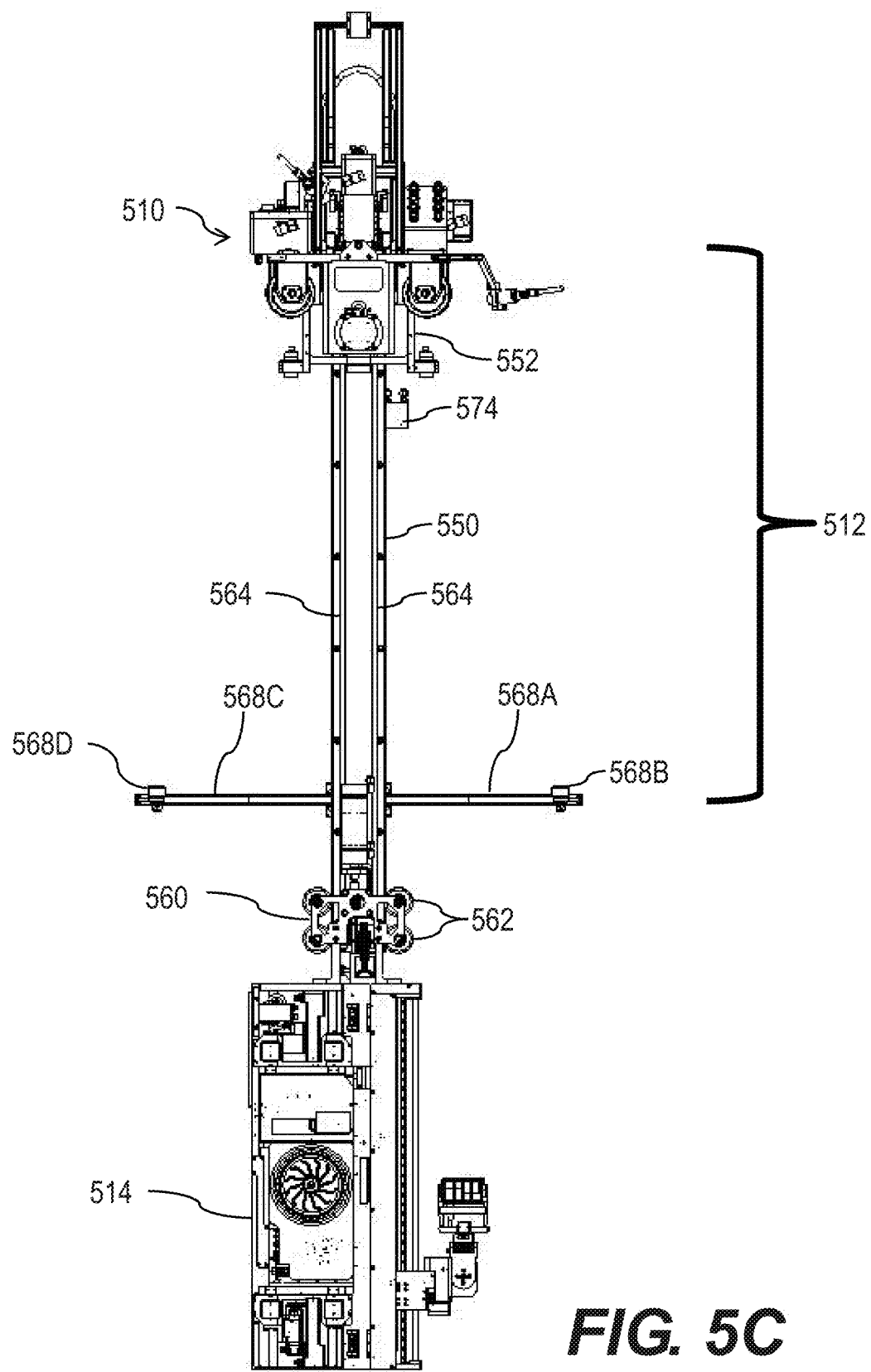
FIG. 5C is a rear view of an arm of a system for inspecting core shrouds from outer surfaces of the core shrouds, according to some example embodiments.
Figure 5D:
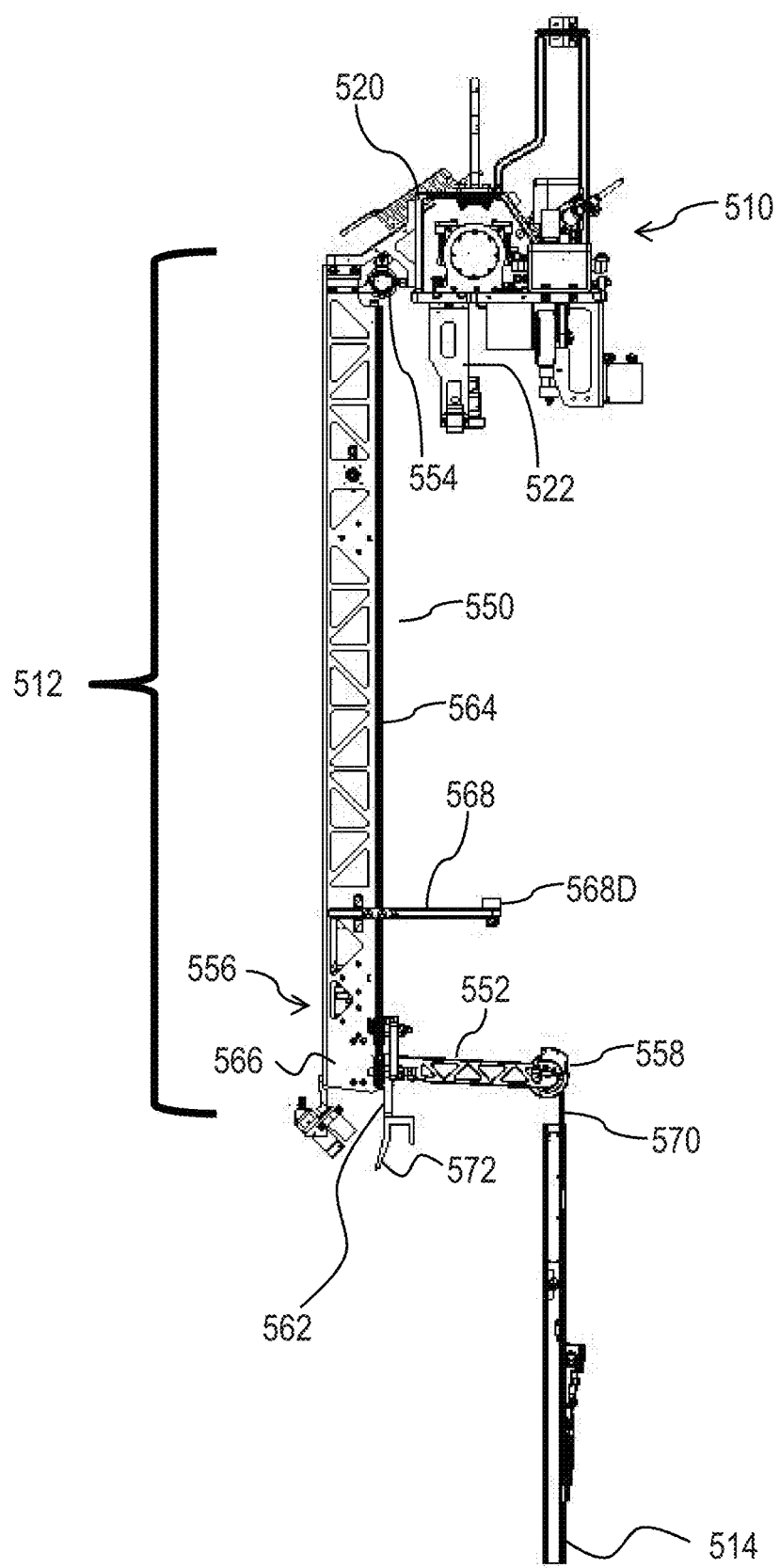
FIG. 5D is a right-side view of an arm of a system for inspecting core shrouds from outer surfaces of the core shrouds, according to some example embodiments.

FIG. 5A is a front perspective view of an arm of a system for inspecting core shrouds from outer surfaces of the core shrouds, according to some example embodiments; FIG. 5B is a rear perspective view of an arm of a system for inspecting core shrouds from outer surfaces of the core shrouds, according to some example embodiments; FIG. 5C is a rear view of an arm of a system for inspecting core shrouds from outer surfaces of the core shrouds, according to some example embodiments; and FIG. 5D is a right-side view of an arm of a system for inspecting core shrouds from outer surfaces of the core shrouds, according to some example embodiments.

In some example embodiments, arm 512 may comprise first arm portion 550, second arm portion 552, first pulley 554, second pulley 556, third pulley 558, carriage 560, carriage rollers 562, tracks 564, pivot actuator 566, and/or optional second stabilizing device 568.

As discussed above, tether 570 may be considered as part of arm 512. In some example embodiments, ROV 514 may be operatively connected to arm 512 via tether 570.

In some example embodiments, arm 512 may be operatively connected to framework 520 of trolley 510. In some example embodiments, first arm portion 550 may be operatively connected to framework 520 of trolley 510, and second arm portion 552 may be operatively connected to first arm portion 550 at carriage 560, carriage rollers 562, tracks 564, and/or pivot actuator 566.

In some example embodiments, tether 570 may extend from winch 528 of trolley 510, around first pulley 554 and through first arm portion 550 to second pulley 556 in pivot actuator 566, around second pulley 556 in pivot actuator 566 and through second arm portion 552 to third pulley 558, and around third pulley 558 to ROV 514.

Carriage 560 may be configured to move along a length of first arm portion 550. Such movement may be facilitated by carriage rollers 562 that may be guided by tracks 564 of first arm portion 550. In order to minimize the potential for interference with tether 570, carriage rollers 562 and tracks 564 of first arm portion 550 may be on an exterior of first arm portion 550.

In some example embodiments, arm 512 may comprise optional docking mechanism 572 and/or a positive stop. The positive stop may be set, for example, electrically, magnetically, and/or mechanically to protect the components of system 508.

In some example embodiments, ROV 514 may be mated with optional docking mechanism 572 or tether 570 may be spooled in to the positive stop (for ease of understanding, the discussion of the docked mode below focuses on optional docking mechanism 572). For ROV 514, this is referred to as the docked mode. When ROV 514 is not mated with optional docking mechanism 572, this is referred to as the undocked mode (ROV 514 directly below trolley 510 relative to the circumferential direction of core shroud 300) or the deployed mode (ROV 514 not directly below trolley 510 relative to the circumferential direction of core shroud 300).

The docked mode may be used, for example, during installation of system 508 on core shroud 300, during scanning of outer surface 316 of core shroud 300 (e.g., upper barrel) in the docked mode, during transition of ROV 514 from the docked mode to the undocked mode, during transition of ROV 514 from the undocked mode to the docked mode, and/or during removal of system 508 from core shroud 300.

The undocked mode may be used, for example, during transition of ROV 514 from the docked mode to the undocked mode, during scanning of outer surface 316 of core shroud 300 (e.g., mid barrel and/or lower barrel) in the undocked mode, and/or during transition of ROV 514 from the undocked mode to the docked mode.

The deployed mode may be used, for example, during transition of ROV 514 from the undocked mode to the deployed mode, during scanning of outer surface 316 of core shroud 300 (e.g., mid barrel and/or lower barrel) in the deployed mode, and/or during transition of ROV 514 from the deployed mode to the undocked mode. In the deployed mode, operation of ROV 514 is coordinated with that of winch 528.

In the undocked mode and the docked mode, tether 570 may run in a substantially vertical direction, with respect to the circumferential direction of core shroud 300, from third pulley 558 to ROV 514. In contrast, in the deployed mode, tether 570 may not run in a substantially vertical direction, with respect to the circumferential direction of core shroud 300, from third pulley 558 to ROV 514.

In the undocked mode, there may be coordinated motion between trolley 510 and horizontal drive module(s) (discussed below) of ROV 514. For example, in the coordinated motion, trolley 510 may maintain linear position relative to ROV 514 or trolley 510 may maintain angular position relative to ROV 514.

In some example embodiments, alignment of linear position between trolley 510, ROV 514, and/or tether 570 may use plumb bob techniques. In addition, a laser beam may be used to create a visible line on core shroud 300 that may be used for the alignment.

In some example embodiments, pivot actuator 566 may shift second arm portion 552 between a substantially horizontal orientation and a substantially vertical orientation. In some example embodiments, pivot actuator 566 may shift second arm portion 552 between the substantially horizontal orientation, the substantially vertical orientation, or orientations between the substantially horizontal orientation and the substantially vertical orientation. In some example embodiments, pivot actuator 566 may be pneumatically actuated.

In some example embodiments, shifting second arm portion 552 from the substantially horizontal orientation to the substantially vertical orientation may move third pulley 558 and/or ROV 514 farther from outer surface 316 of core shroud 300. In some example embodiments, shifting second arm portion 552 from the substantially vertical orientation to the substantially horizontal orientation may move third pulley 558 and/or ROV 514 closer to outer surface 316 of core shroud 300.

In the substantially horizontal orientation, second arm portion 552 may allow ROV 514 to be placed close to outer surface 316 of core shroud 300 when ROV 514 is to scan a barrel (e.g., lower barrel) of core shroud 300 with a radius that is less than a radius of a barrel (e.g., upper barrel) that is above the barrel to be scanned.

In some example embodiments, travel of second arm portion 552 toward the substantially horizontal orientation may be limited to allow ROV 514 to be placed close to outer surface 316 of core shroud 300 when ROV 514 is to scan a barrel (e.g., mid barrel) of core shroud 300 with a radius that is less than a radius of a barrel (e.g., upper barrel) that is above the barrel to be scanned.

In the substantially vertical orientation, second arm portion 552 may allow ROV 514 to be mated with optional docking mechanism 572.

Second arm portion 552 may ride on an inside of first arm portion 550 when in the substantially vertical orientation and/or when in the substantially horizontal orientation. Pivot actuator 566 may move second arm portion 552 through an angle of greater than 90° when shifting second arm portion 552 from the substantially vertical orientation to the substantially horizontal orientation or from the substantially horizontal orientation to the substantially vertical orientation.

For example, if ROV 514 is in the deployed mode while inspecting a mid barrel of core shroud 300 (e.g., second arm portion 552 in the substantially horizontal orientation), trolley 510 and/or ROV 514 may be moved such that ROV 514 is directly below trolley 510 relative to the circumferential direction of core shroud 300, changing ROV 514 to the undocked mode. Then, pivot actuator 566 may control second arm portion 552 to the substantially vertical orientation (e.g., ROV 514 still in the undocked mode).

With second arm portion 552 to the substantially vertical orientation, spooling in of tether 570 using winch 528 may pull ROV 514 up so that it may mate with optional docking mechanism 572, changing ROV 514 to the docked mode.

Further spooling in of tether 570 using winch 528 may pull ROV 514 (mated with optional docking mechanism 572), second arm portion 552, pivot actuator 566, and/or carriage 560 upward as carriage rollers 562 roll up tracks 564 of first arm portion 550 (e.g., ROV 514 still in the docked mode).

For system 508 comprising trolley 510, arm 512, and/or ROV 514, this may be referred to a compacted mode of system 508. In the compacted mode, trolley 510 may move CW/CCW; winch 528 may spool in tether 570 to raise ROV 514 (mated with optional docking mechanism 572), second arm portion 552, pivot actuator 566, and/or carriage 560 upward as carriage rollers 562 roll up tracks 564 of first arm portion 550; and/or winch 528 may spool out tether 570 to lower ROV 514 (mated with optional docking mechanism 572), second arm portion 552, pivot actuator 566, and/or carriage 560 downward as carriage rollers 562 roll up tracks 564 of first arm portion 550. In this way, ROV 514 may inspect outer surface 316 of core shroud 300 (e.g., upper barrel).

When inspecting the upper barrel of core shroud 300, actuator 574 (e.g., a pneumatic actuator) may extend to act as a stop for carriage 560. The stopping of carriage 560 may allow ROV 514 to undock for inspecting outer surface 316 of core shroud 300.

For system 508 comprising trolley 510, arm 512, and/or ROV 514, further spooling in of tether 570 using winch 528 may raise ROV 514 (mated with optional docking mechanism 572), second arm portion 552, pivot actuator 566, and/or carriage 560 upward as carriage rollers 562 roll up tracks 564 of first arm portion 550 to a positive stop (e.g., ROV 514 at a highest position of system 508 and/or carriage rollers 562 at a highest point of tracks 564 of first arm portion 550). The positive stop may be set, for example, electrically, magnetically, and/or mechanically.

This may be referred to as the fully compacted mode of system 508. The fully compacted mode of system 508 may facilitate installation, handling, and/or removal of system 508 relative to core shroud 300 due to, for example, relatively short moment arms and relatively balanced and fixed weight distribution.

In some example embodiments, a length of first arm portion 550 may be chosen to match a specific core shroud and/or desired scan capability. For example, if it is desired to scan only an upper barrel and mid barrel of a core shroud, a relatively shorter length of first arm portion 550 may provide the required coverage, while also making installation, handling, and/or removal easier. In contrast, if it is desired to scan a lower barrel of the core shroud, a relatively longer length of first arm portion 550 may be needed to provide the required coverage.

In some example embodiments, optional second stabilizing device 568 may be operatively connected to first arm portion 550. However, optimal positioning of second stabilizing device 568 may be dependent on the layout of a specific nuclear power plant. Optional second stabilizing device 568 may be configured to counteract torques tending to cause first arm portion 550 to rotate about a vertical axis. Optional second stabilizing device 568 may be configured to reduce vibration of first arm portion 550 when moving along an outer surface of a core shroud.

In some example embodiments, optional second stabilizing device 568 may comprise first projection 568A, first roller 568B, second projection 568C, and/or second roller 568D. First projection 568A may extend on a first side of first arm portion 550, while second projection 568C may extend on a second side of first arm portion 550. First roller 568B may be near an end of first projection 568A, and may be configured to roll along outer surface 316 of core shroud 300 (e.g., first roller 568B may be oriented horizontally so as to roll along outer surface 316 of core shroud 300 as trolley 510 moves CW/CCW along steam dam 304). Second roller 568D may be near an end of second projection 568C, and may be configured to roll along outer surface 316 of core shroud 300 (e.g., second roller 568D may be oriented horizontally so as to roll along outer surface 316 of core shroud 300 as trolley 510 moves CW/CCW along steam dam 304).

In some example embodiments, materials chosen for arm 512 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal FM potential. For example, materials chosen for arm 512 may comprise aluminum or stainless steel.

In some example embodiments, arm 512 may be designed to minimize overall size and/or weight. For example, arm 512 may comprise a truss design to reduce weight while providing required strength, sufficient rigidity, and/or limited flexibility.

In some example embodiments, materials chosen for tether 570 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal FM potential. For example, materials chosen for tether 570 may comprise stainless steel.

In some example embodiments, tether 570 may be designed to minimize overall size (e.g., diameter) and/or weight. For example, tether 570 may comprise nylon-coated stainless steel wire rope to reduce weight while providing required friction (e.g., low coefficient of kinetic and/or static friction), strength, and wear-resistant properties relative, for example, to riding over the edge of horizontal ledges.

Figure 6A:
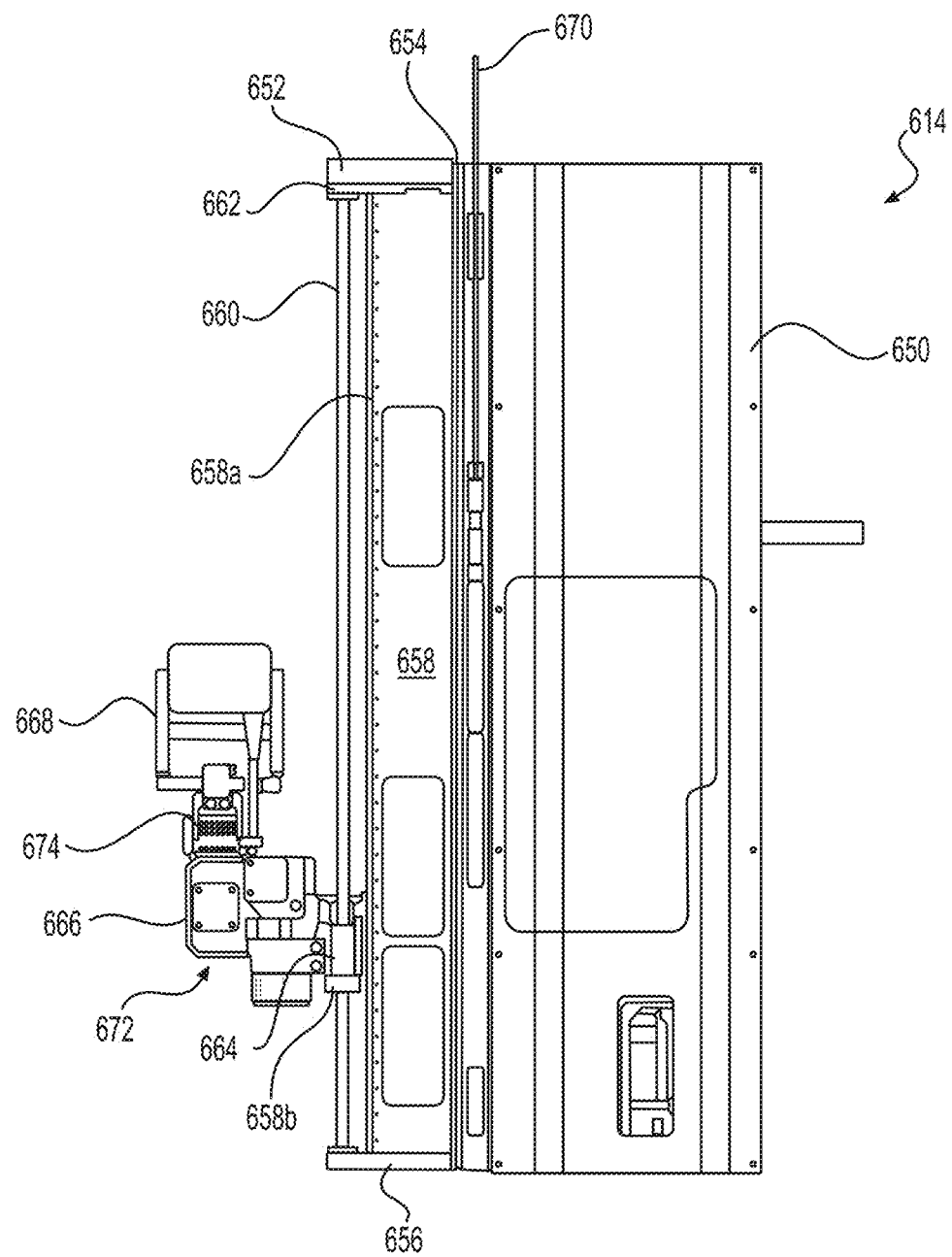
FIG. 6A is a front elevation view of ROV 614 in a left-handed configuration.
Figure 6B:
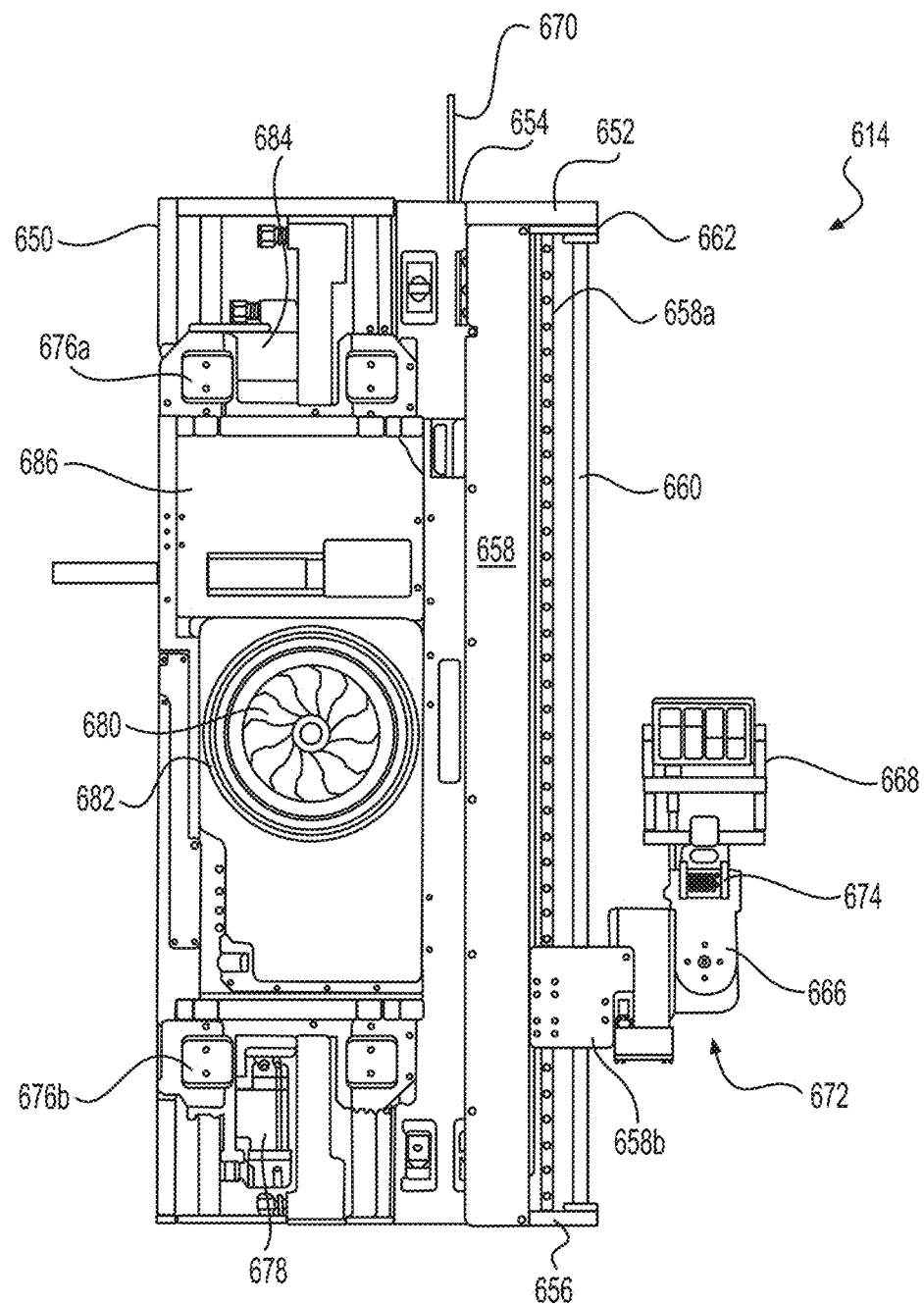
FIG. 6B is a rear elevation view of ROV 614 in the left-handed configuration.
Figure 6C:
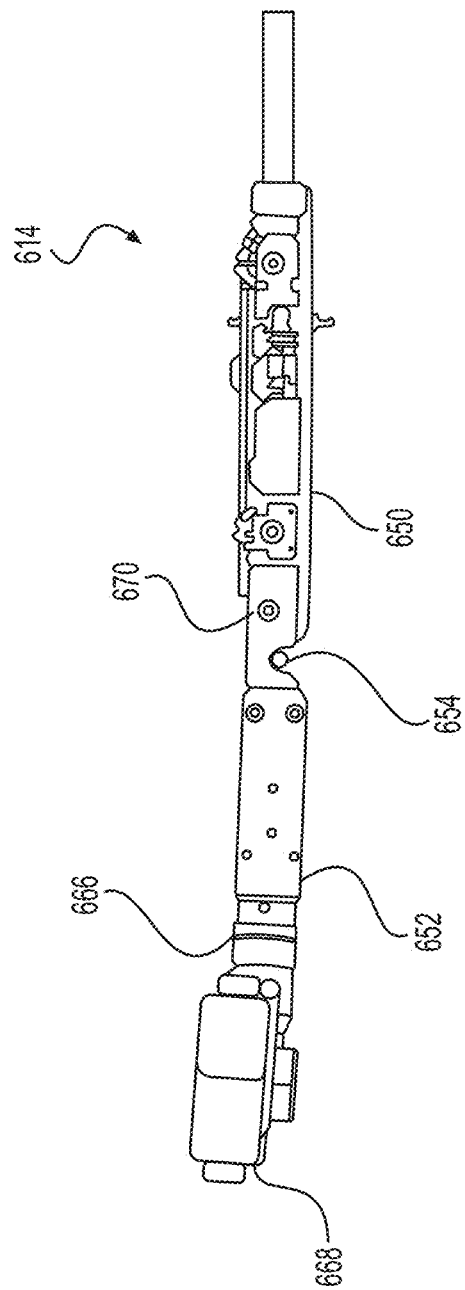
FIG. 6C is a top plan view of ROV 614 in the left-handed configuration.

FIG. 6A is a front elevation view of ROV 614 in a left-handed configuration; FIG. 6B is a rear elevation view of ROV 614 in the left-handed configuration; and FIG. 6C is a top plan view of ROV 614 in the left-handed configuration.

In some example embodiments, ROV 614 may comprise body 650, wing 652, and hinge 654.

In some example embodiments, body 650 may be operatively connected to wing 652 using hinge 654 or similar device. Hinge 654 may facilitate close contact between body 650 and outer surface 316 of core shroud 300, and/or between wing 652 and outer surface 316 of core shroud 300. For example, hinge 654 may facilitate the combination of body 650 and wing 652 in conforming to the curvature of outer surface 316 of core shroud 300, independent of the value of that curvature (e.g., 60" radius or 110" radius of core shroud 300). For example, hinge 654 may be a spring-loaded hinge (e.g., torsion spring) configured to hold both body 650 and wing 652 against outer surface 316 of core shroud 300 over a range of shroud radii while maintaining a low profile relative to outer surface 316 of core shroud 300.

When installed on core shroud 300, ROV 614 may be oriented with respect to core shroud 300 such that an axis of hinge 654 is substantially vertical or parallel to a longitudinal axis of core shroud 300. Hinge 654 may bias body 650 and wing 652 toward outer surface 316 of core shroud 300. The range of travel of wing 652 relative to body 650 may be restricted to a certain range so that wing 652 remains open and ROV 614 may be easily installed on core shroud 300. The strength of the torsion spring may be selected so as not to be too great such that the torsion spring doesn't disrupt the function of the optional one or more device(s) to provide thrust and/or one or more device(s) to create and/or maintain vacuum, as described in further detail below. For example, the strength of the torsion springs may be selected so as not to substantially force body 650 and/or wing 652 of ROV 614 away from core shroud 300. The strength of the torsion springs also may be selected so as to hold elements of ROV 614 against core shroud 300, as described in further detail below.

In some example embodiments, body 650 and/or wing 652 may have curved profile configured to conform to outer surface 316 of core shroud 300. In some example embodiments, body 650 and/or wing 652 may have a low profile in order to fit between outer surface 316 of core shroud 300 and obstructions associated with, for example, jet pump assemblies 306.

In some example embodiments, the profile height may be measured as a distance in a radial direction from outer surface 316 of core shroud 300. The low profile of ROV 614 may be such that ROV 614 is able to move under various core shroud structures such as jet pump assemblies 306 and other obstructions in the annulus. For example, ROV 614 may have profile height of approximately 1.5 inches, approximately 1.7 inches, or approximately 2 inches. At these profile heights, ROV 614 may be able to maneuver behind most obstructions in the annulus. Further, since core shroud 300 may have a curved profile, the curved shape of ROV 614 may maintain the profile height of approximately 1.5 inches, approximately 1.7 inches, or approximately 2 inches even at the circumferentially outer edge(s) of body 650 and/or wing 652.

In the left-handed configuration, wing 652 may be to the left of ROV 614 when looking at ROV 614 against outer surface 316 of core shroud 300. In the right-handed configuration, wing 652 may be to the right of ROV 614 when looking at ROV 614 against outer surface 316 of core shroud 300.

In some example embodiments, ROV 614 may be configured to hang from tether 670 in a vertical or substantially vertical orientation, similar to that depicted in FIGS. 6A and 6B. Umbilicals (not shown) of ROV 614 may be managed by one or more operators (e.g., from a bridge above core shroud 300) to maintain ROV 614 in the vertical or substantially vertical orientation.

In some example embodiments, the umbilicals may be designed to minimize overall size (e.g., diameter) and/or weight. For example, the umbilicals may reduce weight while providing required friction (e.g., low coefficient of kinetic and/or static friction), strength, and wear-resistant properties relative, for example, to riding over the edge of horizontal ledges.

In some example embodiments, ROV 614 may be configured to flip from the left-handed configuration to the right-handed configuration, or from the right-handed configuration to the left-handed configuration, using one or more umbilicals (not shown), possibly assisted by a handling pole or similar device. Because of probe rotation mechanism 666 (discussed below), probe 668 (also discussed below) may be oriented as required.

As would be understood by a PHOSITA, this ability to flip from the left-handed configuration to the right-handed configuration, or from the right-handed configuration to the left-handed configuration, may significantly reduce the time required to conduct a given inspection, potentially reducing both cost and radiation exposure to personnel.

In some example embodiments, ROV 614 may be a maximum of about 15" wide in order to facilitate fitting between adjacent jet pump assemblies 306.

In some example embodiments, ROV 614 may be between about 20 pounds and 40 pounds in weight. In some example embodiments, ROV 614 may be between about 20 pounds and 40 pounds in submerged weight. The buoyancy of ROV 614 may be compensated relative to the submerged weight of ROV 614 to assist in limiting or eliminating vertical drift of ROV 614 while driving ROV 614 horizontally around outer surface 316 of core shroud 300 in the undocked or deployed modes of ROV 614. Such vertical drift (up or down) may affect the accuracy and/or repeatability of scanning data on global and local scales.

In some example embodiments, wing 652 may comprise frame 656, linear bearing 658, lead screw 660, motion driving mechanism 662, nut 664, probe rotation mechanism 666, and/or probe 668.

In some example embodiments, frame 656 may hold linear bearing 658, lead screw 660, and/or motion driving mechanism 662. Linear bearing 658 may comprise stationary portion 658A and slidable portion 658B. Motion driving mechanism 662 may comprise, for example, a motor. Motion driving mechanism 662 may drive lead screw 660, rotation of which may cause slidable portion 658B to slide up and/or down relative to stationary portion 658A under the influence of nut 664, depending on the direction of rotation of motion driving mechanism 662. Motion driving mechanism 662 may be coupled to lead screw 660 using, for example, a belt or gear train so as to transmit torque to lead screw 660. Movement of slidable portion 658B may result in similar movement by probe rotation mechanism 666 and/or probe 668.

In some example embodiments, lead screw 660 may serve as a scan axis for vertical welds and/or an index axis for horizontal welds.

In some example embodiments, probe rotation mechanism 666 may allow adjustment of probe 668 to a desired orientation (which may or may not be predetermined) using gimbal 672. First and second portions of gimbal 672 may move relative to each other under the action of a worm gear (not shown) driven by a motor (not shown) in order to achieve reliable, robust relative movement. Gimbal 672 may comprise torsion spring 674 configured to bias probe 668 against outer surface 316 of core shroud 300. Torsion spring 674 may be protected by a foreign material exclusion ("FME") guard (not shown).

For example, this adjustment may allow inspection of horizontal welds of core shroud 300, vertical welds of core shroud 300, and/or welds of core shroud 300 at angles in between horizontal and vertical without reconfiguring ROV 614 (e.g., approximately 180° rotation from approximately vertically upward (+90°) to approximately vertically downward (−90°); may be used, for example, approximately vertically upward (+90°), approximately horizontal (0°), approximately vertically downward (−90°)).

In some example embodiments, probe 668 may be configured to inspect welds of core shroud 300. In some example embodiments, probe 668 may be an ultrasonic ("UT") probe. As known to a PHOSITA, probe 668 may measure and/or collect, for example, UT volumetric data of heat-affected zones in and/or around welds of core shroud 300.

As discussed above, tether 670 may be considered as part of ROV 614. Tether 670 may prevent loss of ROV 614 due to, for example, loss of suction against core shroud 300, while driving horizontally around core shroud 300, or while inspecting core shroud 300. As discussed above, tether 670 may provide gross vertical positioning of ROV 614 relative to outer surface 316 of core shroud 300.

In some example embodiments, ROV 614 may further comprise horizontal drive module(s) 676A and 676B, non-driven follower wheel 678, device(s) to create and/or maintain vacuum 680, sealing ring 682, inclinometer 684, and/or ROV junction box 686.

In some example embodiments, ROV 614 optionally may comprise one or more device(s) to provide thrust (not shown) relative to a medium in which ROV 614 is operating. The one or more device(s) to provide thrust may comprise, for example, one or more thrust impellers or water jets. For example, if ROV 614 is not against outer surface 316 of core shroud 300, and if device(s) to create and/or maintain vacuum 676 are not able to draw ROV 614 against outer surface 316 of core shroud 300 (e.g., ROV 614 is too far from outer surface 316 of core shroud 300), then one or more device(s) to provide thrust may act to move ROV 614 relative to the medium in which ROV 614 is operating so that ROV 614 is pushed against outer surface 316 of core shroud 300, or so that ROV 614 is pushed close enough to outer surface 316 of core shroud 300 to allow one or more device(s) to create and/or maintain vacuum 680 to draw ROV 614 against outer surface 316 of core shroud 300.

In some example embodiments, ROV 614 may comprise one or more device(s) to create and/or maintain vacuum 680 relative to outer surface 316 of core shroud 300. The one or more device(s) to create and/or maintain vacuum 680 may comprise, for example, a sealing system with a vacuum pad, an eductor or ejector with a pump (e.g., centrifugal), a venturi with a pump (e.g., centrifugal), a vacuum impeller, or a vortex attractor.

In some example embodiments, horizontal drive module(s) 676A and 676B may be on opposite sides of one or more device(s) to create and/or maintain vacuum 680. For example, horizontal drive module 676A may be above one or more device(s) to create and/or maintain vacuum 680 and horizontal drive module 676B may be below one or more device(s) to create and/or maintain vacuum 680. In another example, horizontal drive module 676A, one or more device(s) to create and/or maintain vacuum 680, and horizontal drive module 676B may be positioned so that operation of horizontal drive module 676A and horizontal drive module 676B does not induce a torque tending to rotate ROV 614 about an axis perpendicular to body 650 (e.g., one or more device(s) to create and/or maintain vacuum 680 may lie on a line segment between horizontal drive module 676A and horizontal drive module 676B).

In some example embodiments, horizontal drive module(s) 676A and 676B may act in coordinated motion so that operation of horizontal drive module 676A and horizontal drive module 676B does not induce a torque tending to rotate ROV 614 about an axis perpendicular to body 650.

In some example embodiments, horizontal drive module(s) 676A and 676B may have a master/slave relationship. For example, the controller may directly control horizontal drive module 676A, while horizontal drive module 676B mimics horizontal drive module 676A.

In some example embodiments, horizontal drive module(s) 676A and 676B may comprise wheels (not shown) configured to contact outer surface 316 of core shroud 300. Materials chosen for the wheels may comprise polyurethane (e.g., polyurethane with an indentation hardness of 60 or 85 measured on the Durometer Shore A scale).

In some example embodiments, non-driven follower wheel 678 may track horizontal position of ROV 614 on outer surface 316 of core shroud 300 without being influenced, for example, by slip due to a gear train or drive wheel. Non-driven follower wheel 678 may provide fine horizontal positioning of ROV 614 relative to outer surface 316 of core shroud 300 by using a feedback device (e.g., encoder, resolver) (not shown) associated with non-driven follower wheel 678.

In some example embodiments, sealing ring 682 may be configured to seal against outer surface 316 of core shroud 300 so that device to create and/or maintain vacuum 680 can create and/or maintain vacuum between ROV 614 and outer surface 316 of core shroud 300. Sealing ring 682 may be configured to allow low-friction motion horizontally, vertically, or both while ROV 614 in is contact with outer surface 316 of core shroud 300. Sealing ring 882 may be configured to ride over minor obstructions and variations of outer surface 316 of core shroud 300 without losing vacuum. For larger obstructions, one or more device(s) to provide thrust (not shown) relative to a medium in which ROV 614 is operating (e.g., water jets) may be engaged to maintain ROV 614 at or near outer surface 316 of core shroud 300 until past the obstruction(s) when vacuum may be reestablished.

In some example embodiments, inclinometer 684 may measure and provide an inclination angle of ROV 614 relative to local horizontal (e.g., plane perpendicular to local vertical). Assuming that an axis of core shroud 300 is also vertical (generally a good assumption), inclinometer 684 may measure and provide an inclination angle of ROV 614 relative to core shroud 300.

In some example embodiments, angles measured by inclinometer 684 may be used in a feedback algorithm to assist in keeping ROV 614 in a level attitude while driving horizontally in the undocked and/or deployed modes of ROV 614 and/or while scanning core shroud 300.

In some example embodiments, ROV junction box 686 may provide connections (e.g., power, signals) between one or more umbilicals and ROV 614 (e.g., via umbilical directly to ROV junction box 686), and/or between trolley junction box 432 and ROV 614 (e.g., via umbilical between trolley junction box 432 and ROV junction box 686).

In some example embodiments, materials chosen for ROV 614 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal FM potential. For example, materials chosen for ROV 614 may comprise aluminum or stainless steel.

Figure 7A:
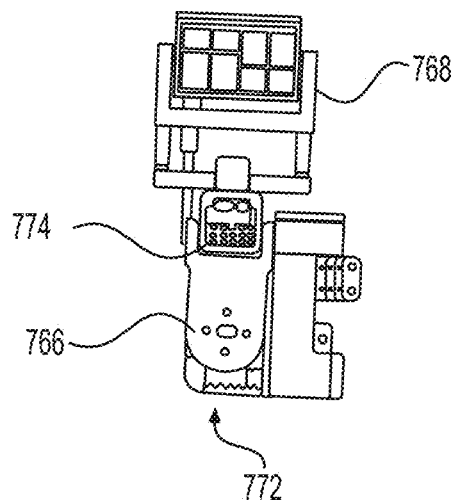
FIG. 7A is a rear elevation view of a probe rotation mechanism with a probe vertically upward (+90°)
Figure 7B:
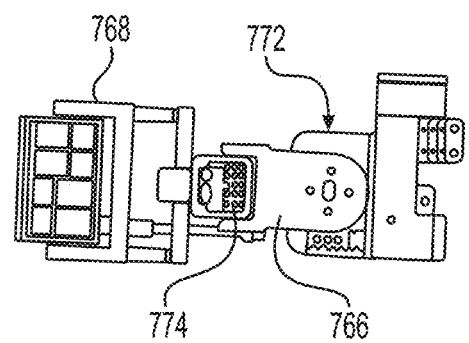
FIG. 7B is a rear elevation view of a probe rotation mechanism with a probe horizontal (0°)

FIG. 7A is a rear elevation view of probe rotation mechanism 766 with probe 768 vertically upward (+90°); FIG. 7B is a rear elevation view of probe rotation mechanism 766 with probe 768 horizontal (0°); and FIG. 7C is a rear elevation view of probe rotation mechanism 766 with probe 768 vertically downward (−90°).

Figure 7C:
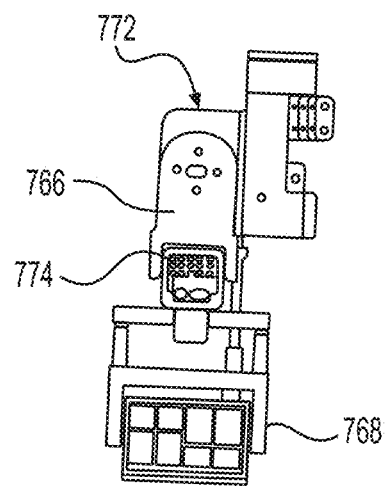
FIG. 7C is a rear elevation view of a probe rotation mechanism with a probe vertically downward (−90°)

FIGS. 7A-7C also depict gimbal 772 and torsion spring 774.

In some example embodiments, scanning may be conducted with probe 768 approximately vertically upward (+90°), approximately horizontal (0°), approximately vertically downward (−90°), or some other position(s) between vertically upward (+90°) and vertically downward (−90°). The scan direction may be independent of the position of probe 768. Such scanning may be conducted with probe 768 approximately vertically upward (+90°), approximately horizontal (0°), or approximately vertically downward (−90°) in order to provide more efficient and effective inspections, and/or improved repeatability of inspection results.

In some example embodiments, scanning may be conducted vertically upward (+90°), horizontal (0°), vertically downward (−90°), or some other direction(s) between vertically upward (+90°) and vertically downward (−90°). The scan direction may be independent of the position of probe 768. Such scanning may be conducted vertically upward (+90°), horizontal (0°), or vertically downward (−90°) in order to provide more efficient and effective inspections, and/or improved repeatability of inspection results. As described above, such scanning may be conducted toward the direction of the side of ROV 314/514/614 on which probe 768 is located ("forward scanning"). Similarly, such scanning may be conducted away from the direction of the side of ROV 314/514/614 on which probe 768 is located ("backward scanning"). In addition, such scanning may be conducted as both forward and backward scanning in order to improve efficiency, effectiveness, and/or repeatability. For example, a same area of core shroud 300 may be scanned both forward and backward to verify accuracy or scan-direction independence of the scan data. In another example, the scan pattern may resemble a raster scan.

Figure 8A:
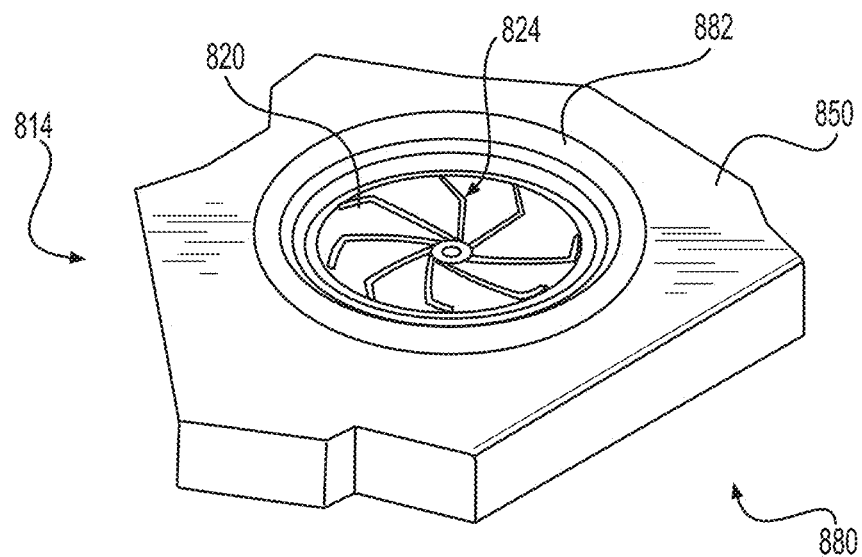
FIG. 8A is a partial perspective view of a first embodiment of a device to create and/or maintain vacuum.
Figure 8B:
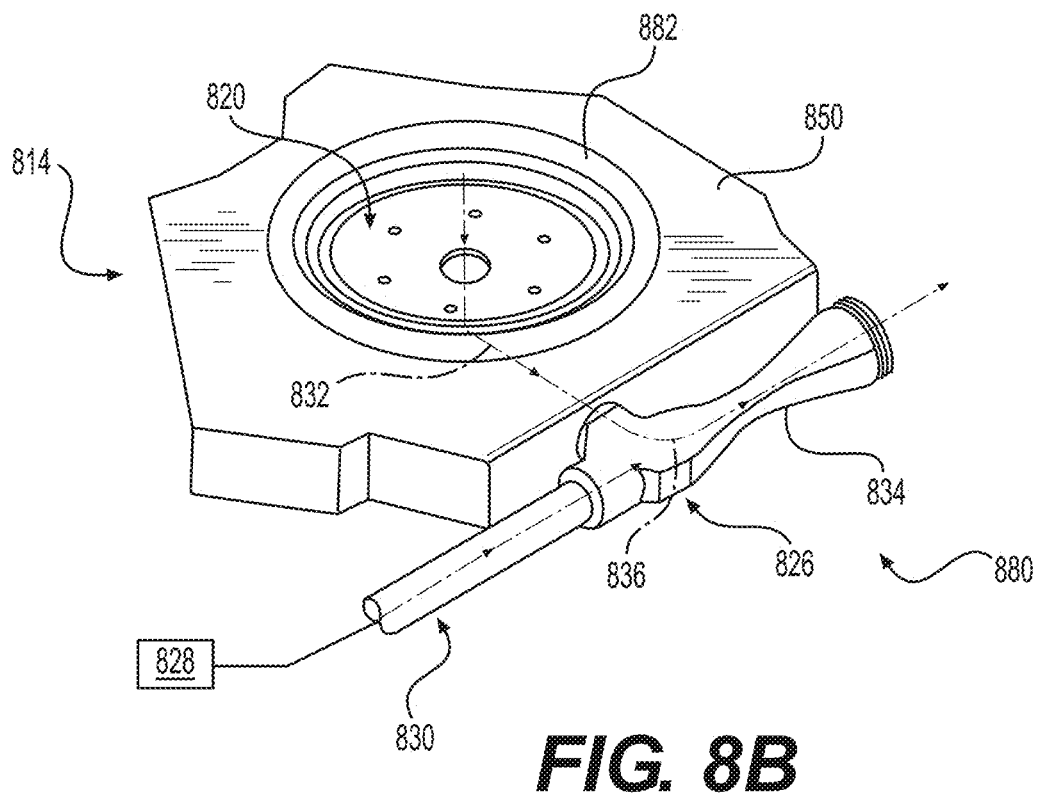
FIG. 8B is a partial perspective view of a second embodiment of a device to create and/or maintain vacuum.
Figure 8C:
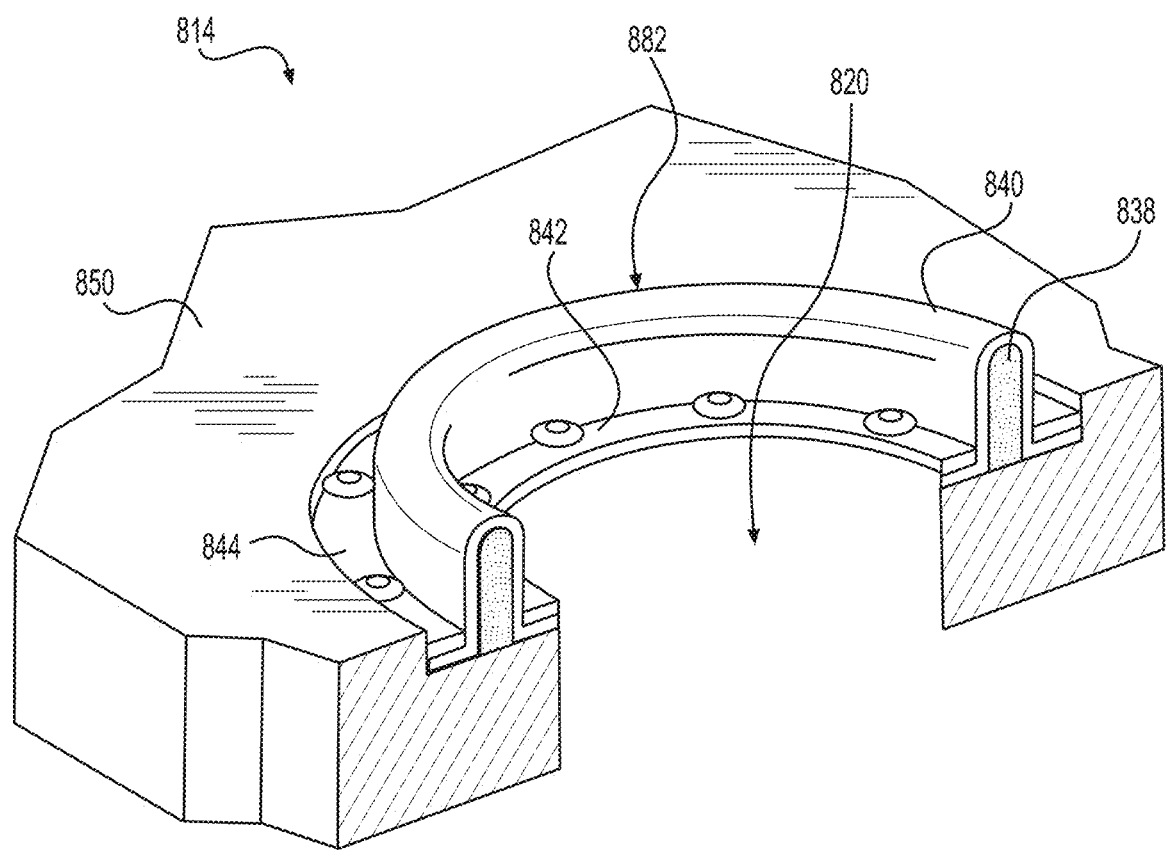
FIG. 8C is a partial cross-sectional perspective view of the first embodiment of a device to create and/or maintain vacuum of FIG. 8A or the second embodiment of a device to create and/or maintain vacuum of FIG. 8B.

FIG. 8A is a partial perspective view of a first embodiment of a device to create and/or maintain vacuum; FIG. 8B is a partial perspective view of a second embodiment of a device to create and/or maintain vacuum; and FIG. 8C is a partial cross-sectional perspective view of the first embodiment of a device to create and/or maintain vacuum of FIG. 8A or the second embodiment of a device to create and/or maintain vacuum of FIG. 8B.

In some example embodiments, ROV 814 may comprise one or more devices to create and/or maintain vacuum 880. One or more devices to create and/or maintain vacuum 880 may create and/or maintain a low pressure or vacuum space in void 820 of body 850. Void 820 may be defined by sealing ring 882. Sealing ring 882 may be configured to seal against outer surface 316 of core shroud 300 in order to isolate void 820 from the annulus so that pressure in void 820 may be reduced or otherwise controlled to adhere ROV 814 to outer surface 316 of core shroud 300.

Sealing ring 882 may be configured not to collapse under suction. Sealing ring 882 may be configured to allow low-friction motion horizontally, vertically, or both while ROV 814 in is contact with outer surface 316 of core shroud 300. Sealing ring 882 may be configured to ride over minor obstructions and variations of outer surface 316 of core shroud 300 without losing vacuum. For larger obstructions, one or more device(s) to provide thrust (not shown) relative to a medium in which ROV 814 is operating (e.g., water jets) may be engaged to maintain ROV 814 at or near outer surface 316 of core shroud 300 until past the obstruction(s) when vacuum may be reestablished.

Sealing ring 882 may be configured to move over obstacles on outer surface 316 of core shroud 300. In general, sealing ring 882 may have a rounded profile and may be made of flexible material to allow ROV 814 to travel over surface variations such as weld crowns. Exemplary sealing ring 882 may include j-shaped polyurethane, foam, and the like. A foam-type sealing ring 882 is described in further detail below.

Referring to FIG. 8A, one or more devices to create and/or maintain vacuum 880 according to the first embodiment may comprise impeller 824 operating in void 820 in order to create and/or maintain the low pressure or vacuum space in void 820 of body 850.

Referring to FIG. 8B, one or more devices to create and/or maintain vacuum 880 according to the second embodiment may comprise venturi valve 826 or jet, pump 828 or other pressurized water supply, and/or hose 830 configured to connect pump 828 to venturi valve 826. A control unit (not shown) may be configured to control pump 828. Pump 828 may draw water from the annulus and/or may supply the water to venturi valve 826. Pump 828 may be located, for example, at the top of core shroud 300, above a water level on the refueling floor. Pump 828 may be configured to recirculate water already in RPV 100.

One or more devices to create and/or maintain vacuum 880 relative to outer surface 316 of core shroud 300 may comprise, for example, a sealing system with a vacuum pad, an eductor or ejector with a pump (e.g., centrifugal), a venturi with a pump (e.g., centrifugal), a vacuum impeller, or a vortex attractor.

More generally, one or more devices to create and/or maintain vacuum 880 relative to outer surface 316 of core shroud 300 should allow movement of ROV 814 relative to outer surface 316 of core shroud 300 (e.g., the vacuum should not be so strong so as to substantially impeded or prohibit such movement).

Venturi valve 826 may be configured displace water from void 820 as a function of water pressure supplied by pump 828. Channel 832 may connect void 820 to flow path 834. Flow path 834 of venturi valve 826 may narrow and then expand in the flow direction such that pressurized water supplied by pump 828 to venturi valve 826 creates low pressure at low-pressure location 836 in venturi valve 826. Channel 832 may connect to flow path 834 at low-pressure location 836. As such, pressurized water supplied by pump 828 through venturi valve 826 draws water from void 820 into flow path 834 of venturi valve 826 and lowers the pressure in void 820. Venturi valve 826 does not require moving parts to lower the pressure in void 820. Thus, venturi valve 826 reduces the risk of breakdown of the vacuum system 130 and reduces the introduction of debris into RPV 100. Venturi valve 826 allows for greater control of vacuum force as compared to using a pump to directly pump water from the void. The vacuum force provided by venturi valve 826 may be controlled as a function of pressurized water or pump flow from pump 828.

Referring to FIG. 8C, sealing ring 882 may comprise closed-cell foam ring 838 or skirt that may be wrapped with cover 840. Inner and outer ring-shaped plates 842, 844 may be bolted to body 850 in order to hold the inner and outer edges of cover 840 to body 850, and/or to hold cover 840 over foam ring 838. Foam ring 838 may compress and/or expand to move over obstacles while still maintaining a vacuum seal. Foam ring 838 may move over obstacles without folding and losing suction, which is a problem with certain other seal designs. Cover 840 may protect foam ring 838 such that sealing ring 882 is durable and robust.

In certain embodiments, multiple sealing ring 882 may be used such that if one sealing ring 882 loses suction while moving over an impediment or obstacle, ROV 814 may remain attached to outer surface 316 of core shroud 300.

In contrast, the optional one or more device(s) to provide thrust relative to medium in which ROV 814 is operating may comprise, for example, a thrust impeller or water jets.

The ability of one or more devices to create and/or maintain vacuum 880 to actually create and maintain vacuum may affect the ability of horizontal drive module(s) 676A and 676B to drive ROV 814 horizontally around outer surface 316 of core shroud 300.

Outer surface 316 of core shroud 300 may affect the ability of horizontal drive module(s) 676A and 676B to drive ROV 814 horizontally. For example, if outer surface 316 of core shroud 300 is too smooth, it may impact the grip of horizontal drive module(s) 676A and 676B. In another example, if outer surface 316 of core shroud 300 is too rough, it may impact the ability to actually create and maintain vacuum, directly impacting the ability of horizontal drive module(s) 676A and 676B to drive ROV 814 horizontally around outer surface 316 of core shroud 300, as discussed above.

The optional one or more device(s) to provide thrust relative to medium in which ROV 814 is operating may improve ability of horizontal drive module(s) 676A and 676B to drive ROV 814 horizontally around outer surface 316 of core shroud 300 in the event of problems creating and/or maintaining vacuum. However, in such situations, ROV 814 may be more sensitive to forces applied by umbilical(s) that provide for electrical power, electrical signals, pneumatic loads, and/or hydraulic loads.

As discussed above, system 308 may comprise tether 570/670. Tether 570/670 may be considered as part of arm 312, ROV 314, trolley 410, or as a separate component. ROV 314/514/614/814 may be operatively connected to arm 312 by tether 570/670.

As also discussed above, a first end of tether 570/670 may be configured to attach to the drum of winch 428. A second end of tether 570/670 may be configured to attach to ROV 314/514/614/814. Tether 570/670 may prevent loss of ROV 314/514/614/814 due to loss of suction, while driving horizontally, while extending or retracting the arm, and/or while scanning a core shroud. As discussed above, tether 570/670 may provide gross vertical positioning of ROV 314/514/614/814 relative to an outer surface of the core shroud by spooling the tether on the drum of winch 428.

In some example embodiments, tether 570/670 may serve as a strength component. For example, tether 570/670 may be configured to support a weight of ROV 314/514/614/814 (e.g., full or submerged) via steam dam 304, winch 428 on trolley 410, and arm 312.

In some example embodiments, tether 570/670 may comprise synthetic rope (e.g., polyethylene, such as Dyneema®), wire rope (coated or uncoated), or a combination of synthetic and wire ropes. For example, the synthetic rope, as an upper portion of tether 570/670, may be lighter and improve handling with respect to the drum of winch 428. In another example, the wire rope, as a lower portion of tether 570/670, may address concerns regarding damage (e.g., wear) to tether 570/670 caused by first and/or second ledges.

In some example embodiments, materials chosen for tether 570/670 may be relatively lightweight materials, consistent with use in nuclear power plants. Such materials may be chosen, for example, so as to avoid or minimize problems due to corrosion (e.g., galvanic corrosion). Such materials may be chosen, for example, so as to be resistant to thermal and/or radiation damage. Such materials may be chosen, for example, based on reliability and/or minimal FM potential. For example, materials chosen for tether 570/670 may comprise stainless steel.

If tether 570/670 comprises wire rope, for example, the wire rope may comprise stainless steel. If coated, the wire rope may be coated, for example, with nylon to reduce friction relative to first and/or second ledges. The optional coating of tether 570/670 may provide additional protection against corrosion of the wire rope.

In some example embodiments, tether 570/670 may be operatively connected to ROV 314/514/614/814 at different locations, depending on a variety of factors, such as a specific core shroud design and/or planned use. For example, tether 570/670 may be operatively connected to ROV 314/514/614/814 at a center of gravity of ROV 314/514/614/814, at a center of buoyancy of ROV 314/514/614/814, on a vertical line passing through the center of gravity of ROV 314/514/614/814, or at a highest point of ROV 314/514/614/814 on the vertical line passing through center of gravity of ROV 314/514/614/814.

In some example embodiments, friction may cause a lack of smooth movement of tether 570/670 relative to first and/or second ledges of a core shroud. For example, this lack of smooth movement may impact movement of ROV 314/514/614/814 and/or level attitude of ROV 314/514/614/814 in undocked mode (e.g., deployed). The optional coating of tether 570/670 may reduce or eliminate such friction-related concerns.

In some example embodiments, tether 570/670 may limit or eliminate vertical drift of ROV 314/514/614/814 while driving ROV 314/514/614/814 horizontally in undocked mode (e.g., deployed). Such vertical drift may affect accuracy of scanning data on global and local scales.

In some example embodiments, system 308/508 may have at least six degrees of freedom that directly or indirectly impact scanning of outer surface 316 of core shroud 300 by probe 668/768. First, trolley 310/410/510 may drive CW/CCW around steam dam 304. Second, winch 428/528 may raise/lower ROV 314/514/614/814 by spooling in/out tether 570/670. Third, pivot actuator 566 may shift second arm portion 552 between substantially horizontal/vertical orientations. Fourth, motion driving mechanism 662 may drive lead screw 660 to raise/lower probe rotation mechanism 666/766. Fifth, probe rotation mechanism 666/766 may adjust probe 668 to a desired orientation. Sixth, ROV 314/514/614/814 may operate in the deployed mode.

In some example embodiments, at least three coordinate system axes relevant to system 308/508 may be referred to as "motorized". First, a transverse axis (e.g., axis of core shroud barrels) motorized by horizontal drive device 426. Second, a vertical axis (e.g., axis of lead screw 660) motorized by motion driving mechanism 662. Third, a rotation axis (e.g., axis of probe rotation mechanism 666/766) motorized by motor and/or worm gear associate with gimbal 672.

From a navigation perspective, in some example embodiments, gross horizontal positioning of ROV 314/514/614/814 may be provided relative to shroud head bolt lugs 302 of core shroud 300 by using one or more proximity sensors 442. In some example embodiments, gross horizontal positioning of ROV 314/514/614/814 may be provided relative to core shroud 300 by the first feedback device (e.g., encoder, resolver) of the first motor of trolley 310/410/510. In some example embodiments, fine horizontal positioning of ROV 314/514/614/814 may be provided relative to outer surface 316 of core shroud 300 by using a feedback device (e.g., encoder, resolver) associated with non-driven follower wheel 678.

In some example embodiments, gross vertical positioning of ROV 314/514/614/814 may be provided relative to outer surface 316 of core shroud 300 by spooling tether 570/670 on the drum of winch 428/528. In some example embodiments, fine vertical positioning of ROV 314/514/614/814 may be provided relative to outer surface 316 of core shroud 300 by using lead screw 660 (e.g., ROV 314/514/614/814 in docked mode).

In some example embodiments, fine horizontal and vertical positioning of ROV 314/514/614/814 relative to outer surface 316 of core shroud 300 may be improved by using an algorithm in the controller that is configured to maintain level attitude when ROV 314/514/614/814 is driving and/or scanning horizontally in undocked and/or deployed modes of ROV 314/514/614/814.

As would be understood by a PHOSITA, although the ROVs, systems, and methods for inspecting core shrouds of nuclear power plants of the present application have been generally described with reference to core shroud 300, the ROVs, systems, and methods for inspecting core shrouds of nuclear power plants of the present application are also applicable to other components in a nuclear plant, and to other components not in nuclear power plants.

Algorithms for implementation or control of the ROVs, systems, and methods for inspecting core shrouds of nuclear power plants discussed in the present application may be used for implementation or control of more general purpose apparatuses, systems, and/or methods.

Methods for implementation or control of the ROVs, systems, and methods for inspecting core shrouds of nuclear power plants discussed in the present application may be written as computer programs and can be implemented in general-use digital computers that execute the programs using a computer-readable recording medium. In addition, a structure of data used in the methods may be recorded in a computer-readable recording medium in various ways. Examples of the computer-readable recording medium include storage media such as magnetic storage media (e.g., ROM (Read-Only Memory), RAM (Random-Access Memory), USB (Universal Serial Bus), floppy disks, hard disks, etc.) and optical recording media (e.g., CD-ROMs (Compact Disc Read-Only Memories) or DVDs (Digital Video Discs)).

In addition, some example embodiments may also be implemented through computer-readable code/instructions in/on a medium (e.g., a computer-readable medium) to control at least one processing element to implement some example embodiments. The medium may correspond to any medium/media permitting the storage and/or transmission of the computer-readable code.

The computer-readable code may be recorded/transferred on a medium in a variety of ways, with examples of the medium including recording media, such as magnetic storage media (e.g., ROM, floppy disks, hard disks, etc.) and optical recording media (e.g., CD-ROMs or DVDs), and transmission media such as Internet transmission media. Thus, the medium may be such a defined and measurable structure including or carrying a signal or information, such as a device carrying a bitstream according to some example embodiments. The media may also be a distributed network, so that the computer-readable code is stored/transferred and executed in a distributed fashion. Furthermore, the processing element could include a processor or a computer processor, and processing elements may be distributed and/or included in a single device.

In some example embodiments, some of the elements may be implemented as a 'module'. According to some example embodiments, 'module' may be interpreted as software-based components or hardware components, such as a field programmable gate array (FPGA) or an application specific integrated circuit (ASIC), and the module may perform certain functions. However, the module is not limited to software or hardware. The module may be configured so as to be placed in a storage medium which may perform addressing, or to execute one or more processes.

For example, modules may include components such as software components, object-oriented software components, class components, and task components, processes, functions, attributes, procedures, subroutines, segments of program code, drivers, firmware, microcodes, circuits, data, databases, data structures, tables, arrays, and variables. Functions provided from the components and the modules may be combined into a smaller number of components and modules, or be separated into additional components and modules. Moreover, the components and the modules may execute one or more central processing units (CPUs) in a device.

Some example embodiments may be implemented through a medium including computer-readable codes/instructions to control at least one processing element of the above-described embodiments, for example, a computer-readable medium. Such a medium may correspond to a medium/media that may store and/or transmit the computer-readable codes.

The computer-readable codes may be recorded in a medium or be transmitted over the Internet. For example, the medium may include a ROM, a RAM, a CD-ROM, a magnetic tape, a floppy disc, an optical recording medium, or a carrier wave such as data transmission over the Internet. Further, the medium may be a non-transitory computer-readable medium. Since the medium may be a distributed network, the computer-readable code may be stored, transmitted, and executed in a distributed manner. Further, for example, the processing element may include a processor or a computer processor, and be distributed and/or included in one device.

It should be understood that the example embodiments described herein should be considered in a descriptive sense only and not for purposes of limitation. Descriptions of features or aspects within each embodiment should typically be considered as available for other similar features or aspects in other embodiments.

Although example embodiments have been shown and described, it would be appreciated by a PHOSITA that changes may be made in these example embodiments without departing from the principles and spirit of the disclosure, the scope of which is defined by the claims and their equivalents.

What is claimed is:

1. A method for inspecting a core shroud having an outer surface, the method comprising:
    installing a system for inspecting the core shroud on the core shroud;
    driving the system horizontally around the core shroud; and
    using a sensor of the system to inspect the core shroud;
    the system includes:
        a trolley;
        a tether;
        an arm structure including a first arm portion and a second arm portion, the second arm portion including a first end and a second end, the first end being connected to a lower portion of the first arm portion, the second arm portion being an actuated arm that is configured to pivot; and
        a remotely operated vehicle (ROV) for inspecting the core shroud;
    the ROV includes:
        a body configured to be operatively connected to the tether; and
        the sensor, configured to be operatively connected to the body, and configured to provide inspection information of the core shroud;
    the first arm portion being configured to be operatively connected to the trolley,
    the ROV being configured to be operatively connected to the second arm portion via the tether, and
    the tether being configured to provide vertical position information for the ROV relative to the outer surface of the core shroud.

2. The method of claim 1, wherein the installing of the system for inspecting the core shroud comprises installing the trolley on a steam dam of the core shroud.

3. The method of claim 1, wherein the driving of the system horizontally around the core shroud comprises driving the trolley horizontally around a steam dam of the core shroud.

4. The method of claim 1, wherein the actuated arm is configured to pivot between a vertical position and a horizontal position.

* * * * *